US010647129B2

(12) United States Patent
Hanazawa et al.

(10) Patent No.: US 10,647,129 B2
(45) Date of Patent: May 12, 2020

(54) PRINTING METHOD AND SET OF PROCESSING FLUID AND INK

(71) Applicants: Atsufumi Hanazawa, Tokyo (JP); Hiroshi Gotou, Kanagawa (JP); Tsutomu Maekawa, Kanagawa (JP); Yukitaka Watarai, Kanagawa (JP); Koji Katsuragi, Kanagawa (JP); Tomohiro Nakagawa, Kanagawa (JP)

(72) Inventors: Atsufumi Hanazawa, Tokyo (JP); Hiroshi Gotou, Kanagawa (JP); Tsutomu Maekawa, Kanagawa (JP); Yukitaka Watarai, Kanagawa (JP); Koji Katsuragi, Kanagawa (JP); Tomohiro Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 15/913,959

(22) Filed: Mar. 7, 2018

(65) Prior Publication Data
US 2018/0265728 A1 Sep. 20, 2018

(30) Foreign Application Priority Data

Mar. 16, 2017 (JP) ................................ 2017-051665
Jan. 22, 2018 (JP) ................................ 2018-007940

(51) Int. Cl.
*B41J 2/21* (2006.01)
*C09D 11/52* (2014.01)
(Continued)

(52) U.S. Cl.
CPC ........... *B41J 2/2114* (2013.01); *B41J 2/2107* (2013.01); *C08G 18/283* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2001/0033318 A1* 10/2001 Koitabashi ............. B41J 2/2114
347/101
2003/0064206 A1 4/2003 Koyano et al.
(Continued)

FOREIGN PATENT DOCUMENTS

JP 8-193175 7/1996
JP 2002-079739 3/2002
(Continued)

*Primary Examiner* — Manish S Shah
(74) *Attorney, Agent, or Firm* — Oblon, McClelland, Maier & Neustadt, L.L.P.

(57) ABSTRACT

A printing method includes applying a processing fluid to a recording medium and applying an ink to the recording medium, wherein the processing fluid contains a first nonionic resin including the following structure unit a-1, the first nonionic resin having a glass transition temperature of 15 degrees C. or lower, wherein the ink contains a second nonionic resin including the following structure unit a-1 and a coloring material Structure unit a-1

$$\left(\begin{array}{c} H \\ | \\ OCN \\ \| \\ O \end{array}\right).$$

20 Claims, 8 Drawing Sheets

(51) Int. Cl.
*C09D 11/102* (2014.01)
*C08K 3/30* (2006.01)
*C08L 75/04* (2006.01)
*C08G 18/79* (2006.01)
*C08G 18/75* (2006.01)
*C08G 18/32* (2006.01)
*C09D 11/40* (2014.01)
*C08G 18/80* (2006.01)
*C09D 11/38* (2014.01)
*C08G 18/28* (2006.01)
*C09D 11/54* (2014.01)

(52) U.S. Cl.
CPC ..... *C08G 18/3203* (2013.01); *C08G 18/3206* (2013.01); *C08G 18/3262* (2013.01); *C08G 18/758* (2013.01); *C08G 18/792* (2013.01); *C08G 18/8064* (2013.01); *C08K 3/30* (2013.01); *C08L 75/04* (2013.01); *C09D 11/102* (2013.01); *C09D 11/38* (2013.01); *C09D 11/40* (2013.01); *C09D 11/52* (2013.01); *C09D 11/54* (2013.01); *C08K 2003/3045* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | | |
|---|---|---|---|
| 2008/0092309 A1* | 4/2008 | Ellis | D06M 11/155 8/478 |
| 2011/0032303 A1* | 2/2011 | Li | B41M 5/0017 347/20 |
| 2011/0054097 A1* | 3/2011 | Park | C09D 159/00 524/201 |
| 2011/0102497 A1* | 5/2011 | Sato | B41M 5/0017 347/21 |
| 2013/0278690 A1* | 10/2013 | Saito | B41J 2/2107 347/102 |
| 2014/0125731 A1 | 5/2014 | Katsuragi | |
| 2014/0132661 A1* | 5/2014 | Inumaru | B41J 2/2107 347/21 |
| 2016/0318299 A1* | 11/2016 | Arai | B41J 2/01 |
| 2017/0247561 A1 | 8/2017 | Nakagawa et al. | |

FOREIGN PATENT DOCUMENTS

| | | |
|---|---|---|
| JP | 2003-160750 | 6/2003 |
| JP | 2005-001387 | 1/2005 |
| JP | 2012-188566 | 10/2012 |
| JP | 2014-111355 | 6/2014 |

\* cited by examiner

DIRECTION OF
CONVEYANCE

PRINTING METHOD AND SET OF PROCESSING FLUID AND INK

CROSS-REFERENCE TO RELATED APPLICATIONS

This patent application is based on and claims priority pursuant to 35 U.S.C. § 119 to Japanese Patent Application Nos. 2017-051665 and 2018-007940, filed on Mar. 16, 2017, and Jan. 22, 2018, respectively, in the Japan Patent Office, the entire disclosures of which are hereby incorporated by reference herein.

BACKGROUND

Technical Field

The present invention relates to a printing method and a set of a processing fluid and an ink.

Description of the Related Art

Inkjet recording methods are widely diffusing reflecting advantages such as low running costs and low noise.

Typically, taking into account clogging of the ink, dyes, which have high solubility, have been mainly used as colorants for the ink for inkjet printers. However, pigments have been now appealing as colorants to manufacture posters, etc. requiring water resistance and light resistance.

In addition, for printing color images with an inkjet printer, for example, surfactants are added to ink to enhance permeation of the ink to reduce blur at a color boundary of two color overlapping sites.

Regarding such improvement, inkjet recording methods are known which use processing fluid capable of agglomerating a colorant in ink.

For example, a method has been proposed in which images are formed on porous recording media having excellent ink absorption using ink containing a self-dispersible pigment and a polyurethane binder and an ionic polymer precipitator or an acidic precipitator. Also, an image forming method has been proposed in which an ink for inkjet containing an anionic dye or an anionic compound and a pigment is agglomerated by a liquid composition using both a cationic material and a nonionic polymer to prevent bleed.

In addition, another image forming method has been proposed in which, with regard to an ink set containing an ink and a reaction liquid to react with the ink, ink for forming two colors is used in addition to three color ink of yellow, magenta, and cyan to reduce the amount of ink discharging so that occurrence of wrinkle can be prevented.

Moreover, yet another image forming method has been proposed in which, by using a processing fluid containing a cationic polymer material in a high ratio that reduces dispersibility of ink for recording containing an anionic coloring material, images with high density can be obtained free of occurrence of curling and cockling.

SUMMARY

According to the present invention, provided is an improved printing method which includes applying a processing fluid to a recording medium, and applying an ink to the recording medium, wherein the processing fluid contains a first nonionic resin including the following structure unit a-1, the first nonionic resin having a glass transition temperature of 15 degrees C. or lower, wherein the ink contains a second nonionic resin including the following structure unit a-1 and a coloring material

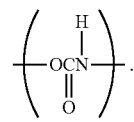

Structure unit a-1

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
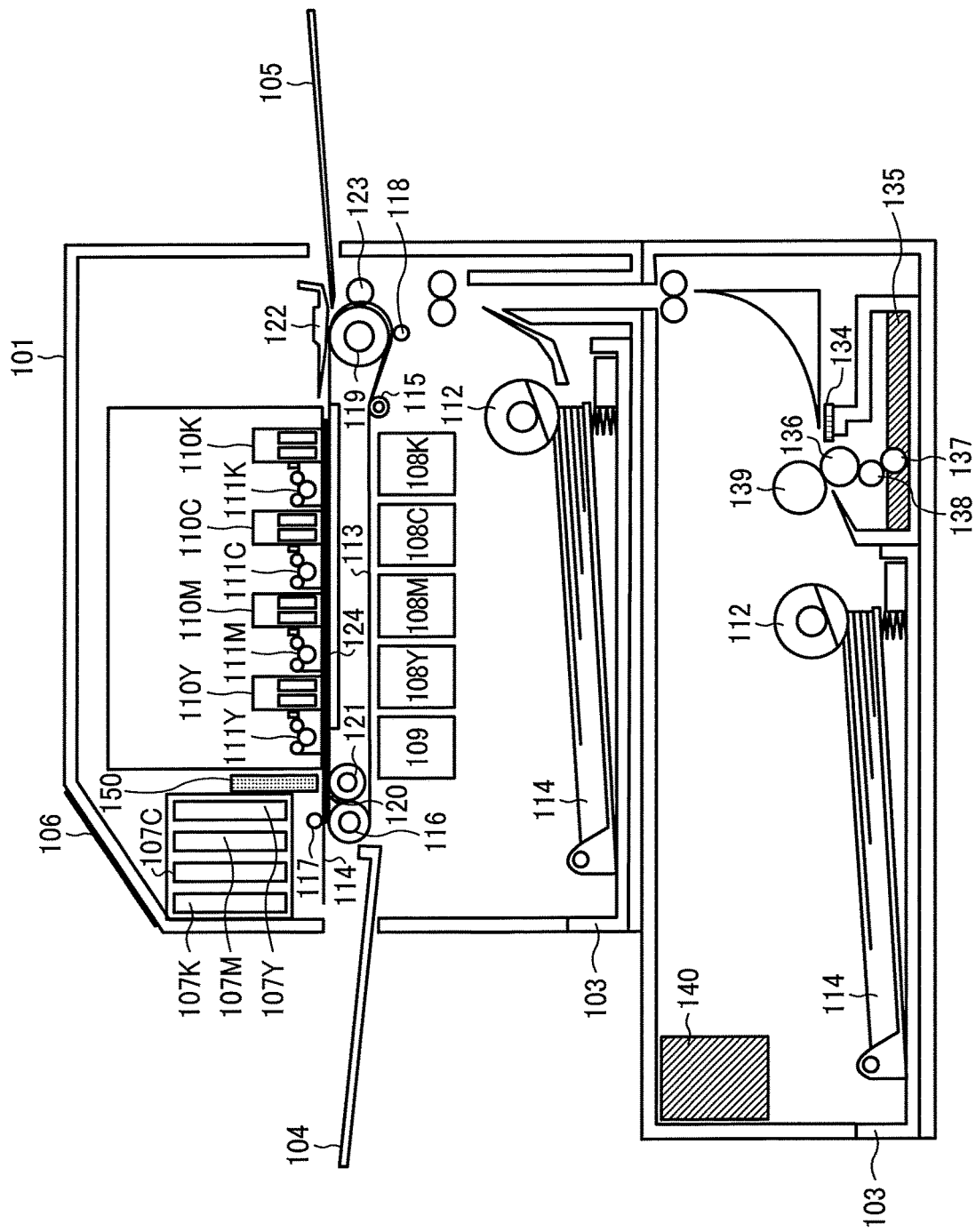
FIG. 1 is a schematic diagram illustrating a side view of an example of the printing device (liquid discharging device) according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

Printing Method and Printing Device

The printing method of the present disclosure includes applying a processing fluid to a recording medium and applying an ink to the recording medium, wherein the processing fluid contains a nonionic resin (first nonionic resin) including the following structure unit a-1, the first nonionic resin having a glass transition temperature of 15 degrees C. or lower, wherein the ink contains a nonionic resin (second nonionic resin) including the following structure unit a-1 and a coloring material. The first nonionic resin and the second nonionic resin can be identical to or different from each other.

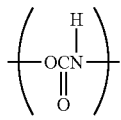

Structure unit a-1

The printing method of the present disclosure has been made based on the knowledge that typical methods using inkjet special paper or plain paper having excellent ink absorption, involve a problem in that abrasion resistance of printed matter deteriorates in the case of coated paper for use in commercial printing and recording media having low absorption property such as paper board in which waste paper pulp for use in paper packaging is mixed in the middle layer or the rear end layer and the surface is coated. In particular, for paper board for use in package printing such as paper package, printed matter is easily damaged in the processes of cutting, carton-forming, transport, etc. of printed matter. Therefore, such printed matter requires excellent abrasion resistance to a degree that ink is not detached by friction by finger nails. The present disclosure is made based on this knowledge that abrasion resistance is insufficient in such methods.

As a result of the investigation, the present inventors have found that if processing fluid and ink contain the nonionic resin having the structure unit a-1 in common, compatibility between the layer of the processing fluid and the layer of the ink of printed matter increases so that the abrasion resistance can be improved for recording media having low absorption such as coated paper and paper board. However, it is not possible to achieve such abrasion resistance that ink is not detached by friction by finger nails.

As the result of a further investigation, the present inventors have found that when the glass transition temperature of the nonionic resin in the processing fluid is 15 degrees C. or lower, adhesion between the layer of the processing fluid and the layer of the ink of printed matter is further enhanced, so that the ink is not detached by friction by finger nails. The present disclosure was thus made.

Moreover, the printing device relating to the present disclosure includes a recording medium, a processing fluid, an ink, a processing fluid applying device to apply the processing fluid to the recording medium and an ink applying device to apply the ink to the recording medium, wherein the processing fluid contains a first nonionic resin including the following structure unit a-1, the first nonionic resin having a glass transition temperature of 15 degrees C. or lower, wherein the ink contains a second nonionic resin including the following structure unit a-1 and a coloring material. The printing device may furthermore optionally other devices.

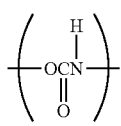

Structure unit a-1

Processing Fluid Applying Process and Processing Fluid Applying Device

In the processing fluid application process, the processing fluid is applied to a recording medium.

The processing fluid application device applies the processing fluid to the recording medium.

The processing fluid application process can be suitably executed by the processing fluid application device.

Processing Fluid

The processing fluid contains the first nonionic resin including the following structure unit a-1, and the first nonionic resin has a glass transition temperature of 15 degrees C. or lower. The processing fluid preferably contains at least one of an organic solvent, water, a cationic resin, and a multivalent metal salt, and a surfactant. It also furthermore optionally contains other components.

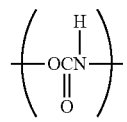

Structure unit a-1

Nonionic Resin (First Nonionic Resin)

The first nonionic resin is dispersible without using a charge.

The first nonionic resin is preferably a particulate nonionic resin.

The nonionic resin means a resin particle from which no monomer having a acidic functional group such as carboxyl group or sulfo group or a basic functional group such as amino group is detected by thermal decomposition gas chromatography mass spectroscopy analysis (GC-MS) (GC-17A, manufactured by SHIMADZU CORPORATION), etc. after a solid portion is isolated from the processing liquid or the ink by centrifugal separation.

The nonionic resin has no charge. Therefore, no agglomerating agent having a charge contained in the processing fluid agglomerates the nonionic resin so that a printing method having uniform and good fixability (abrasion resistance) can be provided.

In addition, a printing method can be provided which achieves excellent anti-beading without inhibiting agglomeration of coloring material by an agglomerating agent.

The nonionic resin includes the structure unit a-1 and may furthermore optionally include other structure units.

To detect the structure unit a-1, a solid portion is isolated by centrifugal separation from the processing fluid or the ink and thereafter, the nonionic resin is refined. The refined nonionic resin is subject to infrared spectroscopy (IR), thermal decomposition gas chromatography mass spectroscopy analysis (GC-MS) (GC-17A, manufactured by SHIMADZU CORPORATION), or nuclear magnetic resonance (NMR).

As the nonionic resin having the structure unit a-1, both a homopolymer and a copolymer is allowable. The copolymerizable monomer has no specific limit and is suitably selected to suit to a particular application. For a copolymer having the structure unit a-1, for example, polyethylene glycol-modified urethane resins and polyester-based urethane resins are usable.

The glass transition temperature (Tg) of the nonionic resin is 15 degrees C. or lower, preferably 0 degrees C. or lower, more preferably −15 degrees C. or lower, and furthermore preferably −38 degrees C. or lower. When the glass transition temperature (Tg) is 15 degrees C. or lower, obtained printed matter has better abrasion resistance because not only adhesion of the processing fluid to a recording medium ameliorates but also compatibility between the layer of the processing fluid and the layer of the ink in the printed matter increases, thereby enhancing adherence therebetween.

To measure the glass transition temperature of the nonionic resin, a solid portion is isolated by centrifugal separation from the processing fluid or the ink and thereafter, the nonionic resin is refined. The refined nonionic resin is subject to, for example, differential scanning calorimetry (DSC).

The nonionic resin adsorbs an aggregate of a colorant and at least one of a cationic resin and a multivalent metal salt to increase the size of the aggregate and the agglomeration of the colorant and stay them on the surface of a recording medium. However, the liquid portion of the ink quickly permeates the recording medium, so that beading can be prevented. In addition, this is little affected by hydrolysis due to water in the processing fluid and has good storage stability so that quality images can be formed for a long period of time.

It is possible to use a suitably synthesized article or a product available on the market as the nonionic resin having the structure unit a-1.

Specific examples of the marketed product include but are not limited, SUPERFLEX® 500M (Tg: −39 degrees C.), SUPERFLEX® E2000 (Tg: −38 degrees C.) (both manufactured by DKS Co. Ltd., and HYDRAN WLI-611 (Tg: −15 degrees C.) (manufactured by DIC CORPORATION). These can be used alone or in combination.

The processing fluid may furthermore optionally contain another nonionic resin, for example, the nonionic resin having the following structure unit a-2.

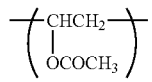

Structure unit a-2

As the nonionic resin having the structure unit a-2, either of a homopolymer or a copolymer is allowable. The copolymerizable monomer has no specific limit and is suitably selected to suit to a particular application. For example, ethylene, vinyl chloride, and vinylidene chloride are suitable.

It is possible to use a suitably synthesized article or a product available on the market as the nonionic resin having the structure unit a-2.

Specific examples of the marketed product include, but are not limited, SUMIKAFLEX® 408HQE, SUMIKAFLEX® 808HQ, and SUMIKAFLEX® 850HQ (Tg: 30 degrees C.) (all manufactured by Sumika Chemtex Company, Limited) and Vinyblan 1225 (manufactured by Nissin Chemical Co., Ltd.).

The proportion of the nonionic resin to the total amount of the processing fluid is preferably from 0.1 to 30 percent by mass, more preferably from 0.4 to 25 percent by mass, and particularly preferably from 0.5 to 15 percent by mass.

Cationic Resin

The cationic resin mentioned above aggregates with a colorant in the ink due to the action of charges and forms agglomeration of the colorant, thereby separating the colorant from the liquid phase. This accelerates fixing on a recording medium. In addition, the processing fluid contains a cationic resin at a high ratio, thereby preventing curling and beading for a recording medium having a low ink absorption property. Thus, quality images can be formed.

The cationic resin has no specific limit and can be suitably selected to suit to a particular application. For example, a cationic resin is preferable which includes a structure unit represented by the following chemical formula 1 or the following chemical formula 2.

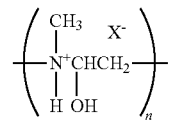

Chemical formula 1

In the Chemical formula 1, X⁻ represents an anionic counter ion and n represents 0 or an integer of from 1 to 13.

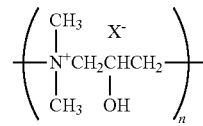

Chemical formula 2

In the Chemical formula 2, X⁻ represents an anionic counter ion and n represents 0 or an integer of from 1 to 13.

Any suitably synthesized articles and products available on the market are usable as the cationic resin.

Specific examples of the marketed product include, but are not limited to, DK6810 (manufactured by SEIKO PMC CORPORATION) and Catiomaster PDT-2 and Catiomaster PD-30 (both manufactured by Yokkaichi Chemical Company, Limited). These can be used alone or in combination.

The proportion of the cationic resin to the total amount of the processing fluid is preferably from 1 to 60 percent by mass, more preferably from 5 to 50 percent by mass, and particularly preferably from 30 to 40 percent by mass in terms of enhancing agglomeration of a colorant and reducing occurrence of beading, and filling in a solid image portion.

Multivalent Metal Salt

The multivalent metal salt aggregates with a colorant in the ink due to the action of charges and forms agglomeration of the colorant to separate the colorant from the liquid phase and accelerate fixing on a recording medium. The processing fluid contains a cationic resin in a high rate, thereby preventing curling and beading for a recording medium having a low ink absorption property. Thus, quality images can be formed.

The multivalent metal salt has no specific limit and can be suitably selected to suit to a particular application. Examples are salts of titanium compounds, chromium compounds, copper compounds, cobalt compounds, strontium compounds, barium compounds, iron compounds, aluminum compounds, calcium compounds, magnesium compounds, zinc compounds, and nickel compounds. These can be used alone or in combination. Of these, in terms of effective agglomeration of pigments, salts of calcium compounds, magnesium compounds, and nickel compounds are preferable, and alkali earth metal salts of calcium, magnesium, etc. are more preferable.

Incidentally, ionic multivalent metal salts are preferable. In particular, calcium salts of the multivalent metal salts stabilize reaction liquid.

There is no specific limit to the calcium compound and it can be suitably selected to suit to a particular application.

Specific examples include, but are not limited to, calcium carbonate, calcium nitride, calcium chlorinate, calcium acetate, calcium sulfate, and calcium silicate.

There is no specific limit to the magnesium compound and it can be suitably selected to suit to a particular application. Specific examples include, but are not limited to, magnesium chloride, magnesium acetate, magnesium sulfate, and magnesium silicate.

There is no specific limit to the barium compound and it can be suitably selected to suit to a particular application. For example, barium sulfate is usable.

The zinc compound has no specific limit and is suitably selected to a particular application. For example, zinc sulfate and zinc carbonate are usable.

The aluminum compound has no specific limit and is suitably selected to a particular application. For example, aluminum silicate and aluminum hydroxide are usable.

Of these, to prevent deterioration of strength of a prior-applied layer due to deliquesce, calcium acetate is preferable.

The concentration of the multivalent metal salt in the processing fluid is preferably from 0.01 to 0.8 mol/kg and more preferably from 0.05 to 0.5 mol/kg. When the concentration is from 0.01 to 0.8 mol/kg, storage stability are particularly excellent, and occurrence of color bleed can be reduced.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Of these, glycerin, diethylene glycol, 1,3-butane diol, and 3-methyl-1,3-butane diol are preferable. These are excellent to prevent defective spraying performance stemming from solubility and moisture evaporation. In addition, it is possible to manufacture a processing fluid having excellent storage stability and discharging stability.

Moreover, in terms of enhancing permeation to a recording medium, 1,2-octane diol is preferable.

The proportion of the organic solvent to the total amount of the processing fluid is preferably from 10 to 60 percent by mass and more preferably from 20 to 60 percent by mass.

Water

As the water, for example, pure water such as deionized water, ultrafiltered water, reverse osmosis water, and distilled water and ultra pure water are suitable. These can be used alone or in combination.

The proportion of the water to the total amount of the processing fluid is preferably 60 percent by mass or less and more preferably from 30 to 50 percent by mass. When the amount is 60 percent by mass or less, it is possible to reduce viscosity increase of processing fluid, gelation, and precipitation of unsolved material at water evaporation.

Surfactant

Surfactants decrease the surface tension of the processing fluid and improve wettability thereof to various recording media, which makes it possible to uniformly apply the processing fluid. The permeation speed of the processing fluid which is suitably wettable due to a surfactant increases to each recording medium, thereby reducing drawbacks regarding fixability and bleed.

In particular, extreme emphasis is on the permeation of the processing fluid into various recording media. If permeation of the processing fluid into a recording medium is good, it is possible to prevent much of the processing fluid from staying on the surface of the recording medium and the inside area close to the surface. If much of the processing fluid does not stay on the surface or the inside near the surface, insufficient filling of a solid image with the colorant, which may be caused by reduction of dot diameters as a result of excessive agglomeration of the coloring material upon the contact between the colorant and the processing fluid, can be prevented. In addition, it is also possible to prevent degradation of fixability (abrasion resistance) of the ink caused by an excessive amount of the colorant component remaining on the surface of the recording medium.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

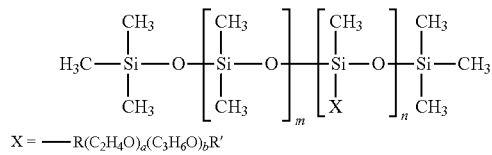

$X = \text{—}R(C_2H_4O)_a(C_3H_6O)_bR'$

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

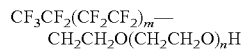

Chemical formula F-1

In the compound represented by Chemical formula F-1, "m" is preferably 0 or an integer of from 1 to 10 and "n" is preferably 0 or an integer of from 1 to 40.

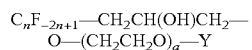

Chemical formula F-2

In the compound represented by the chemical formula F-2, Y represents H or $C_mF_{2m+1}$, where n represents an integer of from 1 to 6, or $CH_2CH(OH)CH_2\text{—}C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used. Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

As the surfactant, an article capable of lowering the surface tension in a small amount is preferable to increase the concentration of the cationic resin. For example, fluorochemical surfactants and polyoxyalkylene alkyl ethers are preferable.

For a fluorochemical surfactant represented by the Chemical formula F-1 illustrated above, the proportion thereof to the total amount of the processing fluid is preferably from 0.01 to 4 percent by mass and more preferably from 0.1 to 1 percent by mass.

For a polyoxyalkylene alkyl ether, the proportion thereof to the total amount of the processing fluid is preferably from 0.5 to 3 percent by mass and more preferably from 1 to 2 percent by mass.

Other Components

The other optional components are not particularly limited and can be suitably selected to suit to a particular application. Examples thereof are a foam inhibitor, a pH regulator, an antibacterial agent, a corrosion inhibitor, a chelate agent, and an antioxidant. These can be used alone or in combination.

Foam Inhibitor

The processing fluid may contain a foam inhibitor to prevent uneven application thereof ascribable to foams.

As the foam inhibitor, a known foam inhibitor typically used for ink such as silicone-based surfactant can be used. However, for a surfactant capable of reducing surface tension in a small amount, in particular, a fluorochemical surfactant represented by the Chemical formula F-1, it is preferable to use a foam inhibitor selected from the group consisting of N-octyl-2-pyrrolidone, 2,4,7,9-tetramethyldecane-4,7-diol, and 2,5,8,11-tetramethyldodecane-5,8-diol to reduce production of foams.

The amount of the foam inhibitor is preferably from 1.5 parts by mass and more and more preferably from 2 to 4 parts by mass to 1 part by mass of the surfactant although it depends on a recording medium and a surfactant to be used.

pH Regulator

An acidic processing fluid may corrode metal parts of an application device. To prevent such drawbacks over an extended period of use, it is suitable to contain a pH regular.

Specific examples include, but are not limited to, 2-amino-2-methyl-1,3-propane diol and 2-amino-2-ethyl-1,3-propane diol. These can be used alone or in combination. It is preferable to adjust the amount of pH regulator in such a manner that the pH of the processing fluid range from 4 to 8.

Antibacterial Agent

Specific examples of the antibacterial agent include, but are not limited to, dehydrosodium sulfate, sodium sorbinate, sodium 2-pyridine thiol-1-oxide, sodium benzoate, and sodium pentachlorophenol. These can be used alone or in combination.

Chelate Reagent

Specific examples of the chelate reagents include, but are not limited to, ethylene diamine sodium tetraacetate, nitrilo sodium triacetate, hydroxyethylethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite. These can be used alone or in combination.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants. These can be used alone or in combination.

The property of the processing fluid has no particular limit and can be suitably selected to suit to a particular application. For example, viscosity, surface tension, and pH can be selected and preferably limited as follows.

Viscosity of the processing fluid is preferably from 0.5 to 30 mPa·s at 25 degrees C. Viscosity can be measured by a viscometer (RE-550L, manufactured by TOKI SANGYO CO., LTD.), etc.

The surface tension of the processing fluid is preferably 45 mN/m or less and more preferably 40 mN/m or less at 25 degrees C.

The pH of the processing fluid is preferably from 4 to 12 and more preferably from 4 to 8.

Examples of methods of applying the processing fluid to a recording medium are liquid discharging methods and application methods.

The liquid discharging method has no specific limit and can be suitably selected to suit to a particular application. For example, it is possible to use an on-demand type head utilizing a piezoelectric element actuator using PZT, etc., and an actuator utilizing electrostatic force and employing a method utilizing a thermal energy or a charge control type head employing a continuous spraying method.

Specific examples of such an application method include, but are not limited to, a blade coating method, a gravure coating method, a gravure offset coating method, a wire bar coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, and a die coating method. Of these, the wire bar coating method and the roll coating method are particularly preferable.

The processing fluid can be applied to a recording medium the surface of which is sufficiently dry or a recording medium having an image formed thereon in the middle of drying. The recording medium after the processing fluid application process can be subject to drying, if desired.

For example, the recording medium can be dried by using a roll heater, a drum heater, or heated air. The heating temperature is preferably 60 degrees C. or higher.

The attachment amount of the processing fluid applied to a recording medium in the processing fluid application process is preferably from 0.1 to 30.0 $g/m^2$ and more preferably from 0.2 to 10 $g/m^2$.

When the attachment amount is 0.1 $g/m^2$ or greater, image quality can be improved. When the attachment amount is 30.0 $g/m^2$ or less, drying property of the processing fluid can be improved and occurrence of curling can be prevented for, in particular, a recording medium having a low ink absorption property.

Recording Medium

The recording medium is not particularly limited. Plain paper, gloss paper, special paper, cloth, etc. are usable. The present disclosure can be applied to, in particular, a recording medium having a low absorption property such as coated paper having a coated surface or non-permeable substrate.

The non-permeable substrate has a surface with low moisture permeability and low absorbency and includes a material having myriad of hollow spaces inside but not open to the outside. To be more quantitative, according to Bristow method, the non-permeable substrate has a water-absorption amount of 10 $mL/m^2$ or less from the start of the contact until 30 $msec^{1/2}$ later. The present disclosure is particularly suitable for a recording medium such as coated paper for use in commercial printing and paper board with a coated surface in which waste paper pulp for use in paper package is mixed in the middle layer and the rear end layer.

Ink Application Process

In the ink application process, ink is applied to a recording medium to form an image thereon.

The ink application device applies is to a recording medium to form an image thereon.

The ink application process is suitably conducted by the ink application device.

Ink

The ink contains the second nonionic resin including the following structure unit a-1 and a coloring material. The ink preferably contains an organic solvent, water, and a surfactant. It may also furthermore optionally contains other components.

Structure unit a-1

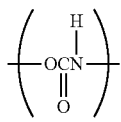

Nonionic Resin (Second Nonionic Resin)

As the nonionic resin for the ink, the same nonionic resin as those for the processing fluid can be used.

The first nonionic resin is preferably a particulate nonionic resin.

The glass transition temperature (Tg) of the second nonionic resin is 20 degrees C. or lower, preferably 15 degrees C. or lower, more preferably 0 degrees C. or lower, particularly preferably −15 degrees C. or lower, and most preferably −38 degrees C. or lower.

The ink of the present disclosure may furthermore optionally include other resin particles in addition to the nonionic resin mentioned above.

Other Resin Particle

Specific examples of the other resin particle include, but are not limited to, urethane resins, polyester resins, polyester-based urethane resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. It is possible to mix a resin emulsion in which resin particles are dispersed in water as a dispersion medium with materials such as a coloring material and an organic solvent to obtain an ink.

It is possible to use a suitably-synthesized resin particle. Alternatively, the other resin particle is available on the market.

Specific examples of the resin particles available on the market include, but are not limited to, Microgel E-1002 and E-5002 (styrene-acrylic-based resin particles, manufactured by Nippon Paint Co., Ltd.), Voncoat 4001 (acrylic-based resin particles, manufactured by DIC CORPORATION), Voncoat 5454 (styrene/acrylic-based resin particles, manufactured by DIC CORPORATION), SAE-1014 (styrene-acrylic-based resin particulates, manufactured by Nippon Zeon Co., Ltd.), Saivinol SK-200 (acrylic-based resin particles, manufactured by Saiden Chemical Industry Co., Ltd.), Primal AC-22 and AC-61 (acrylic-based resin particles, manufactured by The Dow Chemical Company), NANOCRYL SBCX-2821 and 3689 (acrylic-silicone-based resin particles, manufactured by Toyo Ink Co., Ltd.), and #3070 (methylmethacrylate polymer resin particles, manufactured by MIKUNI COLOR LTD.). These can be used alone or in combination.

Of these, containing resins having a carboxyl group is preferable. This causes reaction between the cationic resin in the processing fluid and a resin containing a carboxyl group in the ink, which agglomerates pigments as coloring material on a recording medium. Therefore, the coloring material stays on the surface of a recording medium. Accordingly, not only image quality but also abrasion resistance can be improved.

The resin containing a carboxyl group has no particular limit and can be suitably selected to suit to a particular application. For example, maleic acid resin, styrene-maleic acid, rosin-modified maleic acid resin, alkyd resin, and modified alkyd resin are suitable. These can be used alone or in combination.

The resin containing a carboxylic acid can be synthesized or is available on the market. Specific examples of the marketed product include, but are not limited to, MALKED series, manufactured by Arakawa Chemical Industries, Ltd. and HARIMACK series and HARIPHTHAL series, manufactured by Harima Chemicals Group, Inc.

The resin containing a carboxylic group can be added in a form in which a pigment as the colorant is encapsulated in a resin containing a carboxylic group or a form in which the resin containing a carboxylic group disperses the pigment.

The proportion of the resin containing a carboxylic group to the total mass of ink is preferably from 0.5 to 10 percent by mass and more preferably from 1 to 5 percent by mass.

Organic Solvent

As the organic solvent, the same organic solvent as those for the processing fluid can be used.

Of these, glycerin, 1,3-butanediol, and 3-methyl-1,3-butane diol are preferable. These are excellent to prevent defective spraying performance stemming from solubility and moisture evaporation. In addition, it is possible to manufacture an ink having excellent storage stability and discharging stability.

When the organic solvent in the processing fluid is the same as the organic solvent in the ink, compatibility between the layer of the processing fluid of printed matter and the layer of the ink thereof increases, thereby enhancing attachability, so that abrasion resistance ameliorates. Of these, 1,3-butanediol is preferable as the common organic solvent.

Moreover, in terms of enhancing permeation to a recording medium, using 1,2-octane diol is preferable.

The proportion of the organic solvent in ink has no particular limit and can be suitably selected to suit to a particular application. In terms of drying property and discharging reliability of ink, the proportion is preferably from 10 to 60 percent by mass and more preferably from 20 to 60 percent by mass.

Coloring Material

The coloring material has no particular limit. For example, pigments and dyes are suitable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Surfactant

The ink may contain a surfactant and other additive in a minute amount like the processing fluid, and specific examples thereof are the same as specified above.

Examples of the surfactants are fluorochemical surfactants, silicone-based surfactants, anionic surfactants, nonionic surfactants, and amphoteric surfactants can be suitably used. The surfactants usable for the processing fluid can be used. Of these, fluorochemical surfactants are preferable. These can be used alone or in combination. For a single surfactant not easily dissolved in the ink, such a surfactant can be mixed with other surfactants to make it easily dissolved and stably present therein in some occasions. Of these, the fluorochemical surfactant represented by the following Chemical structure 1 is more preferable.

Chemical structure 1

The proportion of the surfactant to the total amount of the ink is preferably from 0.01 to 4 percent by mass and more preferably from 0.1 to 1 percent by mass. When the amount is 0.01 percent by mass or greater, the effect of the surfactant can be sufficiently obtained. When the amount is 4 percent by mass or less, permeation of the ink to a recording medium can be controlled, so that a decrease of the image density and occurrence of strike-through can be prevented.

The ink is manufactured by dispersing or dissolving the ink composition mentioned above in an aqueous medium followed by optional mixing and stirring.

A stirrer using a typical stirring blade, a magnetic stirrer, a high performance disperser etc., can be used for the mixing and stirring.

Properties of the ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and shortening drying time of the ink.

pH of the ink is preferably from 7 to 12 and more preferably from 8 to 11 in terms of prevention of corrosion of metal material in contact with liquid.

Manufacturing of Ink

The ink is manufactured by dispersing or dissolving a nonionic resin, a colorant, and other optionally components such as an organic solvent, water, a surfactant, and other resins in an aqueous medium, typically water, followed by stirring and mixing, if desired.

This dispersion is conducted by a sand mill, a homogenizer, a ball mill, a paint shaker, an ultrasonic dispersing agent, etc. The stirring and mixing can be conducted by a stirrer having a typical stirring blade, a magnetic stirrer, a high speed dispersing device, etc.

The colors of the ink has no t particular limit and can be suitably selected to suit to a particular application. For example, yellow, magenta, cyan, and black are suitable. Multiple color images can be recorded with an ink set having at least two kinds of such colors. When an ink set having all the colors is used, full color images can be formed.

The ink application device preferably includes an image forming device to discharge the ink mentioned above to the surface of the recording medium mentioned above to form an image thereon, a storage device to store the processing fluid, and a processing device to process the surface of the recording medium before or after the image forming by the image forming device. The image forming device includes at least an ink discharging device and other suitably selected optional devices such as a stimulus generating device and a control device. The ink is preferably applied to an area to which the processing fluid has been applied.

FIG. 1 is a schematic diagram illustrating a side view of an example of the ink application device relating to the present disclosure.

An ink application device 101 includes head units (110K, 110C, 110M, and 110Y) including accumulated heads to discharge ink, maintenance units (111K, 111C, 111M, and 111Y) to maintain the corresponding heads, ink cartridges (107K, 107C, 107M, and 107Y) to supply ink, and sub-ink tanks (108K, 108C, 108M, and 108Y) to store a part of the ink from the cartridges and supply the ink to the heads with a suitable pressure.

Moreover, the ink application device 101 includes a sheet ejection mechanism and a sheet feeding mechanism. The sheet ejection mechanism includes a conveyor belt 113 to adsorb and convey a recording medium 114 with a suction fan 120, a conveying rollers 119 and 121 that support the conveyor belt 113, a tension roller 115 to control the conveyor belt 113 to keep a suitable tension, a platen 124 and a platen roller 118 to cause the conveyor belt 113 to keep suitable plane property, a charging roller 116 to apply an electrostatic charging to adsorb the recording medium 114, an ejection roller 117 to press the recording medium 114, and an ejection tray 104 where the ejected recording medium 114 is stored. The sheet feeding mechanism includes a sheet feeding tray 103 to store the recording medium 114 for printing, separation pads 112 and 122 to send out the recording medium 114 sheet by sheet from the sheet feeding tray 103, a counter roller 123 to cause a charging belt to securely adsorb the recording medium 114, and a bypass tray 105 for manual sheet feeding.

In addition, the ink application device 101 further includes a waste liquid tank 109 to retrieve waste liquid discharged after maintenance and an operation panel 106 for operation of the device and display of the status thereof.

The nozzle lines of each head are disposed along the direction vertical to the direction of conveying the recording medium 114 and extends longer than the recording area. The recording medium 114 is separated from the feeder tray by a separation roller sheet by sheet and adheres to and is fixed on the conveyor belt 113 by a pressure roller. Liquid droplets are discharged to the recording medium 114 at the time of passing through under the head unit to form a patterning at high speed on the recording medium 114. Thereafter, the recording medium 114 is separated from the conveyor belt 113 by a separation claw and ejected to the ejection tray 104 as recorded matter while being supported by the ejection rollers 117.

This device includes an application mechanism to process the surface of the recording medium 114 with a processing fluid 135. The mechanism employs a roller application method. The processing fluid 135 is supplied from a processing fluid storage tank 140. A pump roller 137 pumps up the processing fluid 135 to the surface of the roller to transfer it to a thick control roller 138. Thereafter, the processing fluid transferred to an application roller 136 is transferred and applied to the recording medium 114 passing through between the application roller 136 and a counter roller 139 for application.

The application amount of the processing fluid to be transferred to the application roller 136 is determined by controlling the thickness of nipping with the application roller 136. If not to apply the processing fluid 135, a movable blade 134 is pressed against the application roller 136 to wipe off the processing fluid 135 from the surface of the application roller 136 to a degree that the processing fluid 135 does not remain on the application roller 136. This obviates the risk of malfunction ascribable to thickening of the processing fluid 135 due to drying, fixation on the counter roller 139 for application, and uneven application, etc., which stem from the processing fluid 135 remaining on the application roller 136.

In addition, as illustrated in FIG. 1, two of the sheet feeding units can be separately disposed on the upper part and lower part. In such a case, the sheet feeding unit disposed on the lower part is used when not applying the processing fluid while the sheet feeding unit disposed on the upper part is used to apply the processing fluid.

In addition to the roller application method, it is also possible to apply the processing fluid employing a discharging method such as spraying. For example, a head like the head 110K, which is filled with the processing fluid 135, can discharge it like the ink to the recording medium 114, and the discharging amount and the discharging position can be easily controlled with high precision. In addition, it is also possible to use the roller application method and the spray coating method in combination.

The processing fluid can be applied to any position in any amount by an either method.

Moreover, a heated wind blowing fan 150 heats the recording medium 114 to which the processing fluid and the ink are attached to accelerate drying, thereby improving fixability. In the present disclosure, a heated wind blowing fan is used to dry a recording medium after printing in the heating process. However, the recording medium can be heated not only after printing but also before printing. In addition, a heating roller can be used instead of a heated wind blowing fan.

Figure 2:
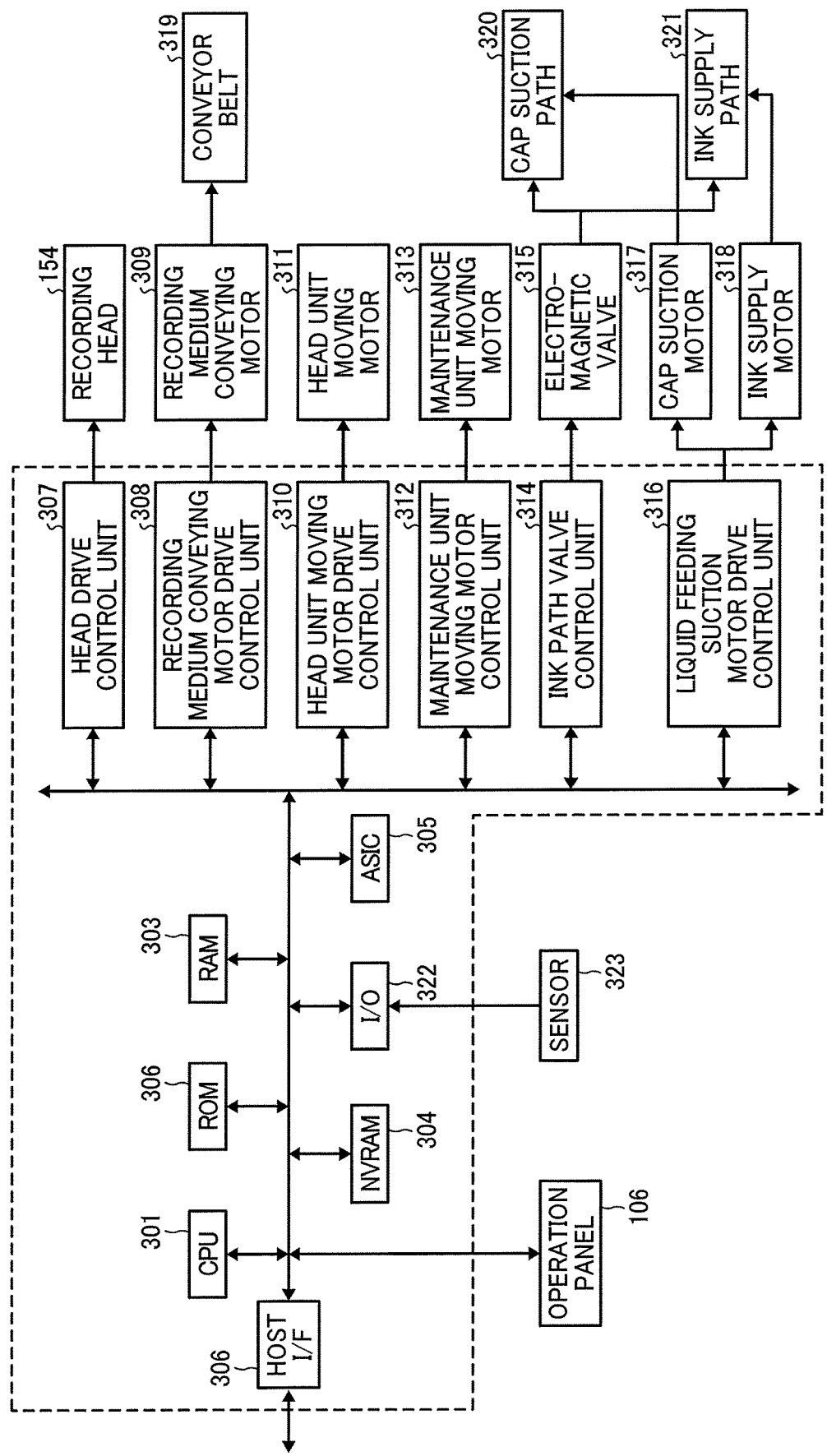
FIG. 2 is a schematic block diagram illustrating the configuration of the control unit of the printing device illustrated in FIG. 1.

Next, the control unit of the liquid discharging device illustrated in FIG. 1 is described with reference to FIG. 2. FIG. 2 is a schematic block diagram illustrating the configuration of the control unit illustrated in FIG. 1.

A control unit 300 includes a central processing unit (CPU) 301 to control the entire of the device, a read-only memory (ROM) 302 to store programs executed by a CPU 301, values and allowable thresholds of nozzle surface contamination level for predetermined discharging of ink to be used in the present disclosure, drive waveform data, and other fixed data, a random access memory (RAM) 303 to temporarily store image data, etc., a non-volatile random access memory (NVRAM) 304 to maintain data even while the power supply is cut, and an application specific integrated circuit (ASIC) 305 to conduct various signal processing for image data, image processing for sorting, etc., and input and output signals to control the entire device.

In addition, the control unit 300 includes a host I/F 306 to send and receive data and signals on the host computer, a head drive control unit 307 to generate waveform to drive and control a pressure generating device for a recording head 154, a recording medium conveying motor drive control unit 308 to drive a recording medium conveying motor 309, a maintenance unit moving motor drive control unit 312 to drive a head unit (carriage) moving motor 311, an ink path valve control unit 314 to control on and off of an electromagnetic valve 315 on ink paths, a liquid feeding suction motor drive control unit 316 to control drive of a cap suction motor 317 and an ink supply motor 318, and an I/O 322 to input detection signals from an encoder to output detection signals in accordance with the amount and speed of movement of the conveyor belt 113, and detection signals from a sensor 323 to detect at least one of a environment temperature and a temperatures humidity, an ink amount detection signal of the sub-ink tank, and detection signals from various sensors. The control unit 300 is connected with an operation panel 106 to input and display information required for this device.

The control unit 300 receives print data, etc. from an information processing device such as home computers, an image reading device such as an image scanner, and an imaging device such as a digital camera on the host computer, at the I/F 306 via a cable or a net.

The CPU 301 reads and analyzes print data in the reception buffer included in the host I/F 306, processes images and sorts data required at an ASIC 305, and transfers the image data (dot pattern data) corresponding to an amount of a single page having a head width of the recording head 154 in synchronization with clock signals to the head drive control unit 307. Dot pattern data to output images are created by, for example, storing font data on the ROM 302 or transferring bit map data converted from image data by a printer driver on the host side to the device.

The head drive control unit 307 drives the recording head 154 by selectively applying a drive pulse to a pressure generating device for the recording head 154 based on image data (dot pattern data) corresponding to the amount of a single page of the recording head 154 input in page by page.

Figure 3:
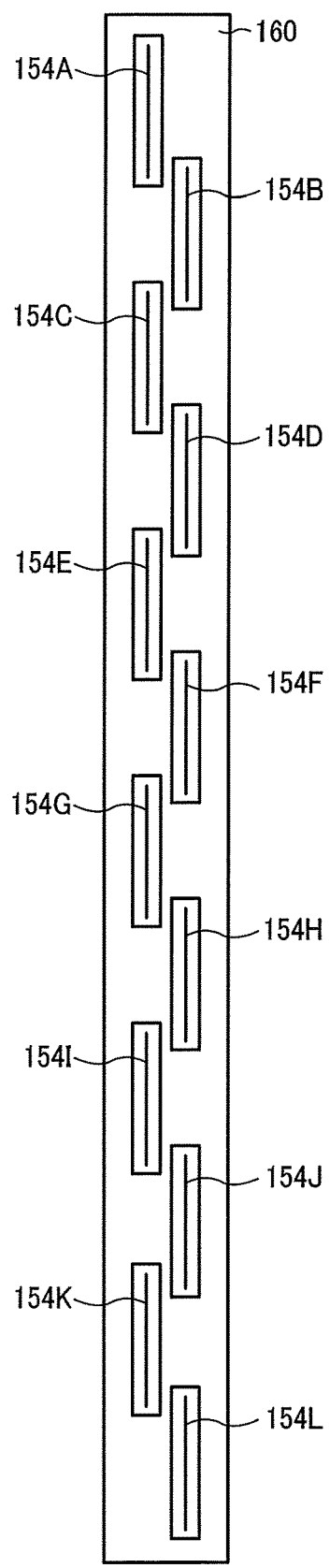
FIG. 3 is a schematic diagram illustrating an example of the head arrangement in a head unit of the liquid discharging device relating to the present disclosure.

FIG. 3 is a schematic diagram illustrating an example of the head arrangement in the head unit of the printing device.

The heads 154A to 154L of the head unit is fixed on a head outer perimeter member 160 in a zigzag manner with a part of each head ovelapping with each other.

Figure 4:
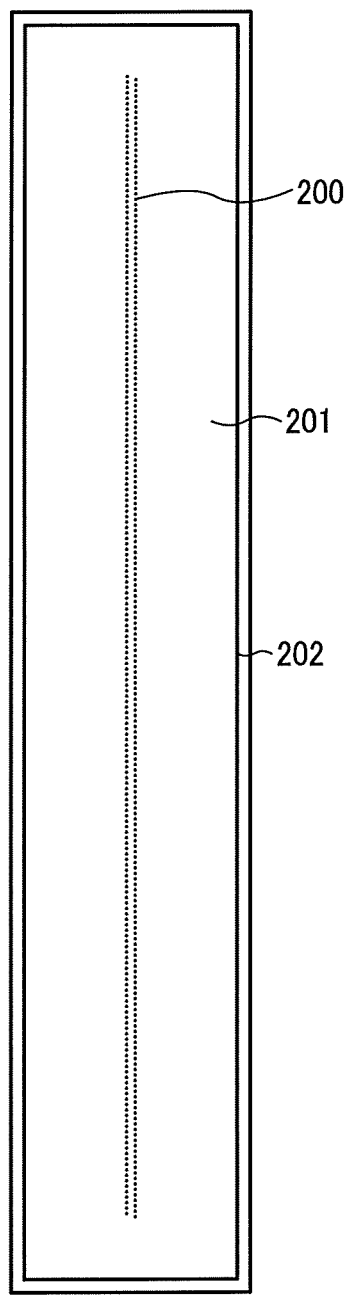
FIG. 4 is a schematic diagram illustrating the head arranged in the head unit illustrated in FIG. 3.

FIG. 4 is a schematic diagram illustrating a head disposed in the head unit illustrated in FIG. 3. Each head includes open nozzles 200 disposed in two lines in zigzag manner on a nozzle plate 201. The space between the head and the head outer perimeter member 160 is sealed with a filler 202 to create no space from the nozzle surface side.

Figure 5:
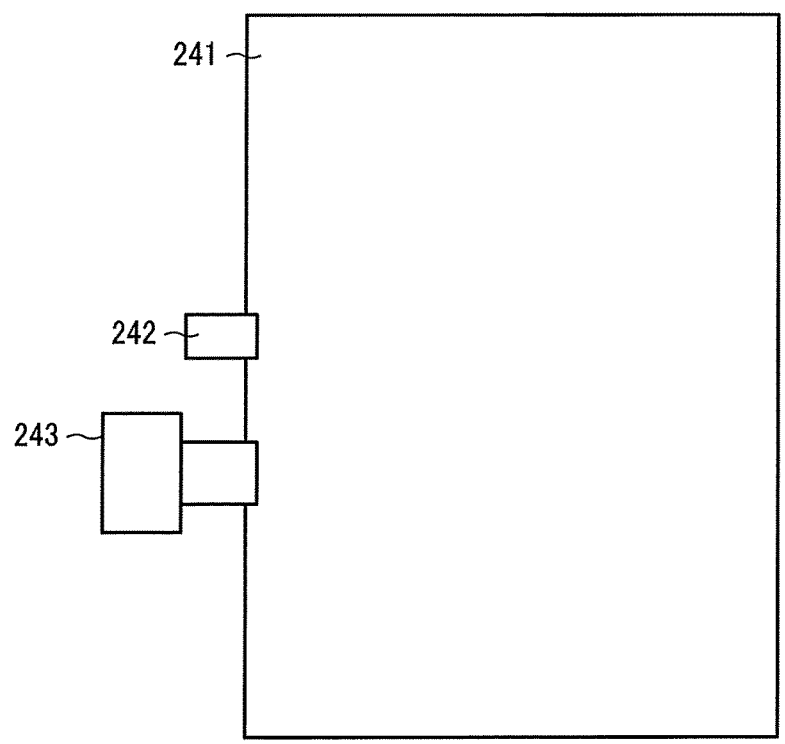
FIG. 5 is a diagram illustrating an example of the ink cartridge for use in the liquid discharging device relating to the present invention.
Figure 6:
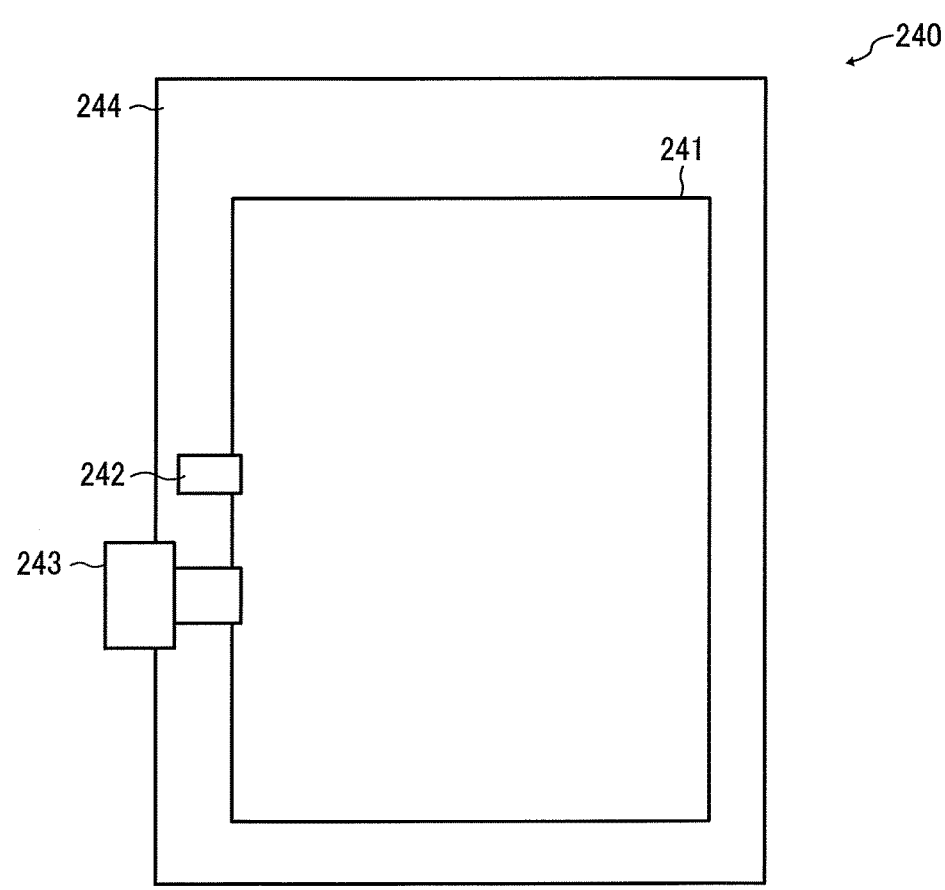
FIG. 6 is a diagram illustrating the ink cartridge illustrated in FIG. 5 including its housing.

Next, the ink cartridge is described in detail with reference to FIGS. 5 and 6. FIG. 5 is a diagram illustrating an example of the ink cartridge. FIG. 6 is a diagram illustrating the ink cartridge illustrated in FIG. 5 including the housing thereof.

An ink bag 241 is filled with ink through an ink inlet 242 as illustrated in FIG. 5. The air remaining in the ink bag 241 is discharged and thereafter the ink inlet 242 is closed by fusion. When in use, an ink outlet 243 made of rubber is pierced by a needle installed onto the liquid discharging device to supply the ink into the liquid discharging device. The ink bag 241 is formed of a packaging material such as aluminum laminate film having no air permeability. The ink bag 241 is accommodated in a cartridge housing 244 typically made of plastic as illustrated in FIG. 6 and detachably attachable to various liquid discharging devices as the ink cartridge 240.

In addition, the processing fluid 135 can be loaded in the ink cartridge 240 instead of the ink, which can be used as an ink cartridge for the processing fluid. Like the ink cartridge, it can be detachably attachable to various image forming devices.

The processing fluid 135 can be applied to the recording medium 114, for example, in the following manner illustrated in FIGS. 7 to 9.

Figure 7:
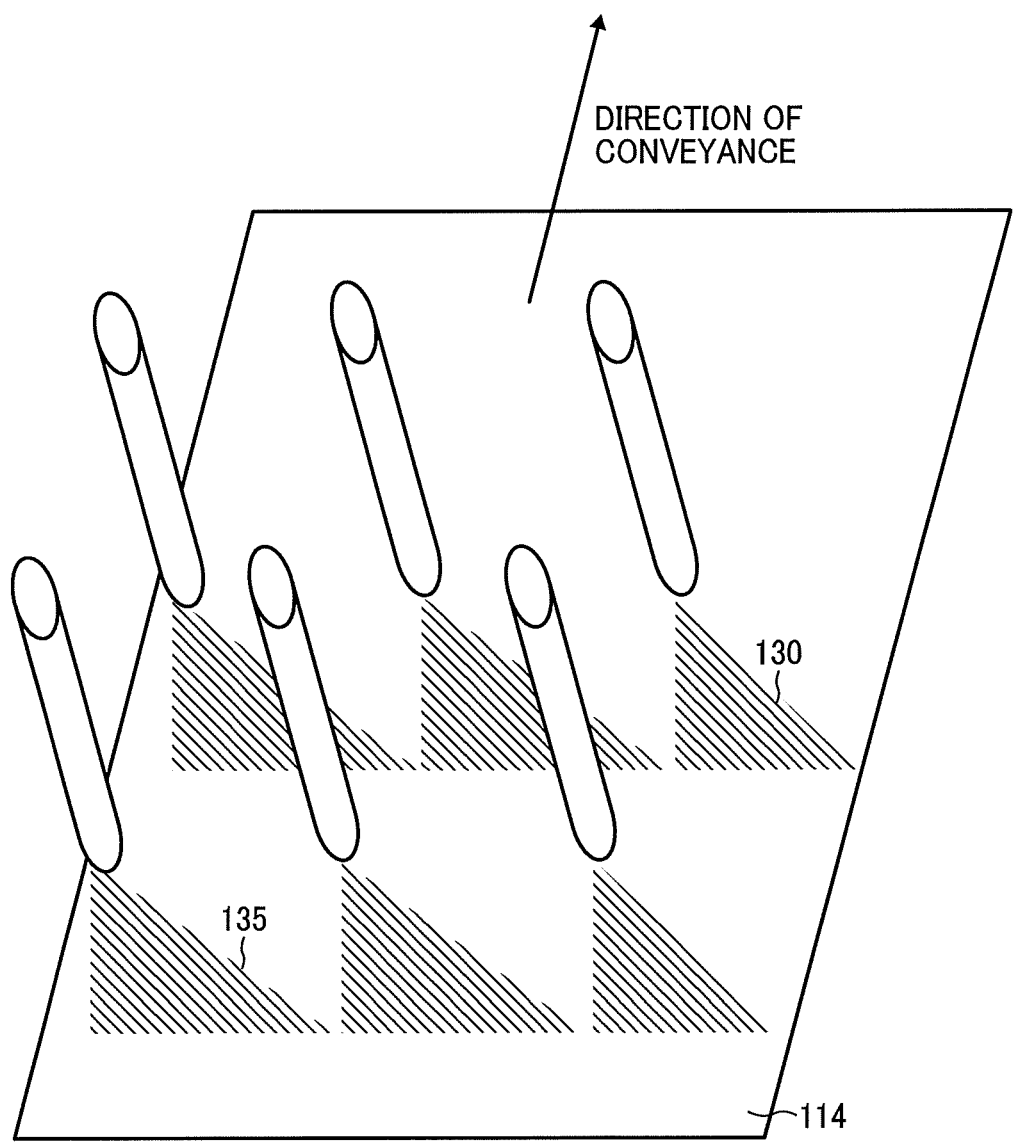
FIG. 7 is a schematic diagram illustrating an example of the discharging method from the discharging head in the liquid discharging device relating to the present disclosure.

FIG. 7 is a diagram illustrating a discharging method from a discharging head. A recording head to discharge the processing fluid 135 is situated upstream of the recording medium 114 in the conveying direction and an aqueous ink 130 is disposed downstream in the conveying direction. Consequently, the processing fluid 135 preliminarily discharged based on predetermined image data can be mixed with the ink 130 on the recording medium 114.

Figure 8:
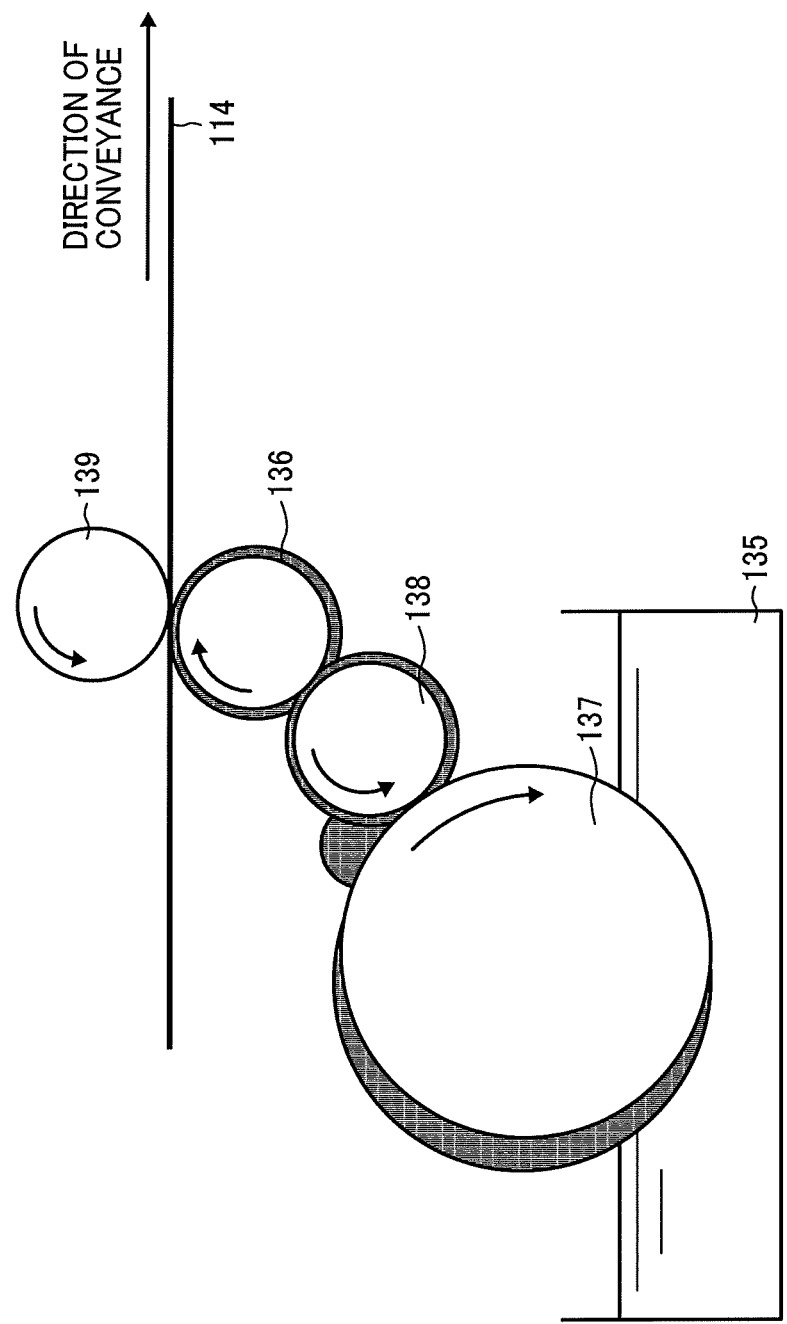
FIG. 8 is a schematic diagram illustrating an example of the discharging method using triplet rolls.

FIG. 8 is a diagram illustrating an application method using triplet rolls, which is described in detail in FIG. 1.

Figure 9:
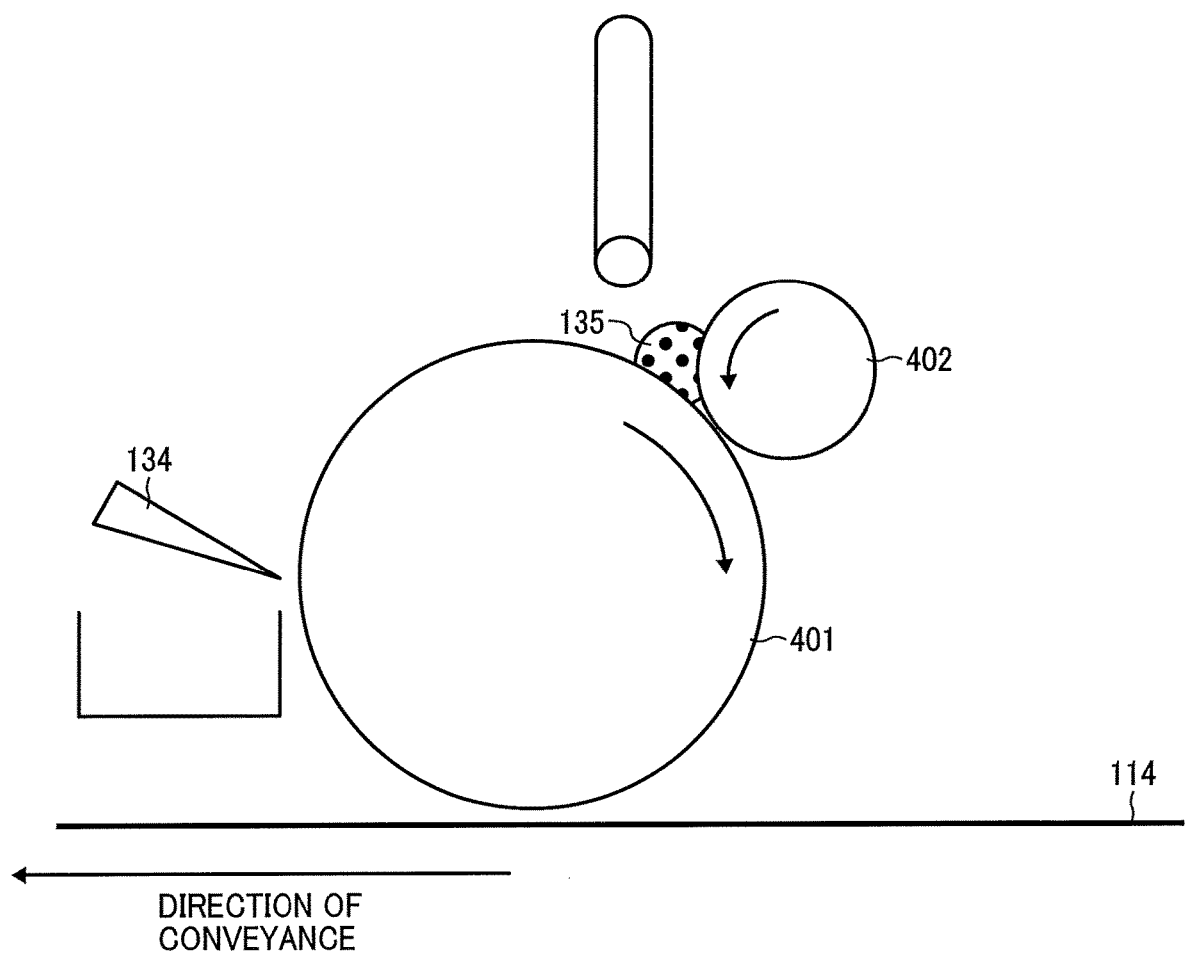
FIG. 9 is a schematic diagram illustrating an example of the application method of twin rolls.

FIG. 9 is a diagram illustrating an application method using twin rolls. The discharging head discharges and applies the processing fluid 135 to the recording medium 114 while an application roller 401 and a layer thickness control roller 402 control the layer thickness of the processing fluid 135. In addition, the excessive amount of the processing fluid 135 remaining on the application roller 401 is retrieved by a movable blade 134. Incidentally, an ink discharging head is disposed on the lower part along the conveying direction.

Image forming, recording, printing, print, etc. in the present disclosure represent the same meaning.

Set of Processing Liquid and Ink

A set of the present disclosure contains a processing fluid containing a first nonionic resin including the following structure unit a-1, the first nonionic resin having a glass transition temperature of 15 degrees C. or lower and an ink containing a second nonionic resin including the following structure unit a-1 and a coloring material. The set may furthermore optionally contain other material.

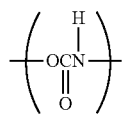

Structure unit a-1

Another set of a processing fluid and an ink of the present disclosure contains the processing fluid containing a first nonionic resin including the following structure unit a-1 and an ink containing a second nonionic resin including the following structure unit a-1 and a coloring material, wherein the first nonionic resin has a glass transition temperature not higher than the second nonionic resin. The set may furthermore optionally contain other material.

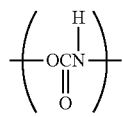

Structure unit a-1

As the processing fluid, the same processing fluid as those for the printing method can be used.

As the ink, the same ink as those for the printing method can be used.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation Example 1 of Nonionic Resin Particle

Preparation of Nonionic Urethane Resin Emulsion

To 1 mol of 1,6-hexanediol, 1.4 mol of dicyclohexylmethane diisocyanate, 0.1 mol of diisocyanate compound obtained by reaction of 1 mol of a trimer of isocyanulate of 1,6-hexamethylene diisocyanate and ⅓ mol of polyethylene glycol monomethyl ether having a molecular weight of 1,000, and 15 percent by mass N-methyl-2-pyrolidone were loaded in a reaction flask for reaction at 90 degrees C. for two hours in a nitrogen atmosphere to obtain a prepolymer.

450 g of the thus-obtained prepolymer composition having a solid portion of 85 percent by mass was dripped in 15 minutes to 600 g of water in which 0.2 g of silicone-based foam inhibitor (SE-21, manufactured by Wacker Asahikasei Silicone Co., Ltd.) was dissolved.

Subsequent to stirring at 25 degrees C. for 10 minutes, the compound represented by the Chemical structure A, ethylenediamine, and adipic acid dihydrazide were dripped to obtain a nonionic urethane resin emulsion containing the following structure unit a-1. The glass transition temperature (Tg) of the thus-obtained nonionic resin urethane resin emulsion measured by differential scanning calorimetry (DSC) (Thermo plus EV02/DSC, manufactured by Rigaku Corporation) was 20 degrees C.

   Chemical structure A

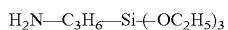   Structure unit a-1

Preparation Example 1 of Processing Fluid

Preparation of Processing Fluid 1

7.0 percent by mass glycerin, 5.0 percent by mass 1,3-butane diol, 2.0 percent by mass 1,2-octane diol, 35.0 percent by mass (solid portion) cationic resin particle (resin particle having a structure unit represented by the following Chemical formula 1, DK6810, manufactured by SEIKO PMC CORPORATION), 0.4 percent by mass polyoxyalkylene alkyl ether (EMULGEN 103, manufactured by Kao Corporation), 0.1 percent by mass PROXEL LV (manufactured by AVECIA GROUP), 0.1 percent by mass benzotriazole, and deionized water were stirred for one hour for uniform mixing. Furthermore, 1.2 percent by mass of N-octyl-2-pyrolidone was added followed by one hour stirring for uniform mixing. Thereafter, 2.0 percent by mass urethane resin emulsion (SUPERFLEX® E2000, resin particle having a structure unit a-1, glass transition temperature of −38 degrees C., manufactured by DKS Co. Ltd.) was added to make the total 100 percent and the system was uniformly mixed by stirring for one hour.

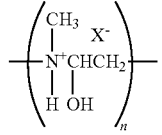

Chemical Formula 1

In the Chemical formula 1, $X^-$ represents $Cl^-$ and n represents 0 or an integer of from 1 to 13.

Preparation Examples 2 to 24 of Processing Fluid

Preparation of Processing Fluid 2 to 24

The processing fluids 2 to 24 were obtained in the same manner as in Preparation Example 1 of Processing Fluid except that the processing fluid of Preparation Example 1 was changed to the compositions shown in Tables 1 to 4.

TABLE 1

| | | | \multicolumn{6}{c}{Processing Fluid} |
|---|---|---|---|---|---|---|---|---|
| | | | 1 | 2 | 3 | 4 | 5 | 6 |
| Organic solvent | Glycerin | | 7.0 | 7.0 | 7.0 | 7.0 | 7.0 | 7.0 |
| | 1,3-Butane diol | | 5.0 | 5.0 | 5.0 | 5.0 | 5.0 | 5.0 |
| | 1,3-Propane diol | | — | — | — | — | — | — |
| | 1,2-Octane diol | | 2.0 | 2.0 | 2.0 | 2.0 | 2.0 | 2.0 |
| Nonionic resin emulsion | Resin particle having structure unit a-1 | Urethane resin emulsion, Tg: −38 degrees C. | 2.0 | 2.0 | 2.0 | 0.5 | 20.0 | 2.0 |
| | | Nonionic urethane resin emulsion, Tg: 20 degrees C. | — | — | — | — | — | — |
| | | Nonionic urethane resin emulsion, Tg: −15 degrees C. | — | — | — | — | — | — |
| Anionic resin emulsion | Anionic urethane resin emulsion | | — | — | — | — | — | — |
| Cationic resin | Cationic resin particle 1 (resin particle having structure unit represented by Chemical formula 1) (solid mass) | | 35.0 | — | — | 35.0 | 35.0 | 1.0 |
| | Cationic resin particle 2 (resin particle having structure unit represented by Chemical formula 2) (solid mass) | | — | 35.0 | — | — | — | — |
| | Polydiaryl dimethyl ammonium chloride (solid mass) | | — | — | 35.0 | — | — | — |
| Multivalent metal salt | Calcium acetate monohydrate | | — | — | — | — | — | — |
| | Calcium chloride dihydrate | | — | — | — | — | — | — |
| | Magnesium sulfate (anhydrous) | | — | — | — | — | — | — |
| | Nickel(II) chloride hexahydrate | | — | — | — | — | — | — |
| | Zinc sulfate (anhydrous) | | — | — | — | — | — | — |
| Surfactant | Polyoxyalkylene alkyl ether | | 0.4 | 0.4 | 0.4 | 0.4 | 0.4 | 0.4 |
| Foam inhibitor | N-Octyl-2-pyrroridone | | 1.2 | 1.2 | 1.2 | 1.2 | 1.2 | 1.2 |
| Antibacterial Agent | PROXEL LV | | 0.1 | 0.1 | 0.1 | 0.1 | 0.1 | 0.1 |
| Corrosion Inhibitor | Benzotriazoles | | 0.1 | 0.1 | 0.1 | 0.1 | 0.1 | 0.1 |
| Water | Deionized water | | Balance | Balance | Balance | Balance | Balance | Balance |
| Total (Percent by mass) | | | 100.0 | 100.0 | 100.0 | 100.0 | 100.0 | 100.0 |
| Concentration (mol/kg) of multivalent metal salt | | | — | — | — | — | — | — |

TABLE 2

| | | | \multicolumn{6}{c}{Processing Fluid} |
|---|---|---|---|---|---|---|---|---|
| | | | 7 | 8 | 9 | 10 | 11 | 12 |
| Organic solvent | Glycerin | | 7.0 | 7.0 | 7.0 | 7.0 | 7.0 | 7.0 |
| | 1,3-Butane diol | | 5.0 | — | 5.0 | 5.0 | 5.0 | 5.0 |
| | 1,3-Propane diol | | — | 5.0 | — | — | — | — |
| | 1,2-Octane diol | | 2.0 | 2.0 | 2.0 | 2.0 | 2.0 | 2.0 |
| Nonionic resin emulsion | Resin particle having structure unit a-1 | Urethane resin emulsion, Tg: −38 degrees C. | 2.0 | 2.0 | — | 0.4 | 25.0 | 2.0 |
| | | Nonionic urethane resin emulsion, Tg: 20 degrees C. | — | — | 2.0 | — | — | — |
| | | Nonionic urethane resin emulsion, Tg: −15 degrees C. | — | — | — | — | — | — |

TABLE 2-continued

|  |  | Processing Fluid | | | | | |
|---|---|---|---|---|---|---|---|
|  |  | 7 | 8 | 9 | 10 | 11 | 12 |
| Anionic resin emulsion | Anionic urethane resin emulsion | — | — | — | — | — | — |
| Cationic resin | Cationic resin particle 1 (resin particle having structure unit represented by Chemical formula 1) (solid mass) | 50.0 | 35.0 | 35.0 | 35.0 | 35.0 | 0.5 |
|  | Cationic resin particle 2 (resin particle having structure unit represented by Chemical formula 2) (solid mass) | — | — | — | — | — | — |
|  | Polydiaryl dimethyl ammonium chloride (solid mass) | — | — | — | — | — | — |
| Multivalent metal salt | Calcium acetate monohydrate | — | — | — | — | — | — |
|  | Calcium chloride dihydrate | — | — | — | — | — | — |
|  | Magnesium sulfate (anhydrous) | — | — | — | — | — | — |
|  | Nickel(II) chloride hexahydrate | — | — | — | — | — | — |
|  | Zinc sulfate (anhydrous) | — | — | — | — | — | — |
| Surfactant | Polyoxyalkylene alkyl ether | 0.4 | 0.4 | 0.4 | 0.4 | 0.4 | 0.4 |
| Foam inhibitor | N-Octyl-2-pyrrolidone | 1.2 | 1.2 | 1.2 | 1.2 | 1.2 | 1.2 |
| Antibacterial Agent | PROXEL LV | 0.1 | 0.1 | 0.1 | 0.1 | 0.1 | 0.1 |
| Corrosion Inhibitor | Benzotriazoles | 0.1 | 0.1 | 0.1 | 0.1 | 0.1 | 0.1 |
| Water | Deionized water | Balance | Balance | Balance | Balance | Balance | Balance |
| Total (Percent by mass) |  | 100.0 | 100.0 | 100.0 | 100.0 | 100.0 | 100.0 |
| Concentration (mol/kg) of multivalent metal salt |  | — | — | — | — | — | — |

TABLE 3

|  |  |  | Processing fluid | | | | | |
|---|---|---|---|---|---|---|---|---|
|  |  |  | 13 | 14 | 15 | 16 | 17 | 18 |
| Organic solvent | Glycerin |  | 7.0 | 7.0 | 7.0 | 7.0 | 7.0 | 7.0 |
|  | 1,3-Butane diol |  | 5.0 | 5.0 | 5.0 | 5.0 | 5.0 | 5.0 |
|  | 1,3-Propane diol |  | — | — | — | — | — | — |
|  | 1,2-Octane diol |  | 2.0 | 2.0 | 2.0 | 2.0 | 2.0 | 2.0 |
| Nonionic resin emulsion | Resin particle having structure unit a-1 | Urethane resin emulsion, Tg: −38 degrees C. | 2.0 | — | 2.0 | 2.0 | 2.0 | 2.0 |
|  |  | Nonionic urethane resin emulsion, Tg: 20 degrees C. | — | — | — | — | — | — |
|  |  | Nonionic urethane resin emulsion, Tg: −15 degrees C. | — | — | — | — | — | — |
| Anionic resin emulsion | Anionic urethane resin emulsion |  | — | — | — | — | — | — |
| Cationic Resin | Cationic resin particle 1 (resin particle having structure unit represented by Chemical formula 1) (solid mass) |  | 60.0 | 35.0 | — | — | — | — |
|  | Cationic resin particle 2 (resin particle having structure unit represented by Chemical formula 2) (solid mass) |  | — | — | — | — | — | — |
|  | Polydiaryl dimethyl ammonium chloride (solid mass) |  | — | — | — | — | — | — |

TABLE 3-continued

|  |  | Processing fluid | | | | | |
|---|---|---|---|---|---|---|---|
|  |  | 13 | 14 | 15 | 16 | 17 | 18 |
| Multivalent metal salt | Calcium acetate monohydrate | — | — | 1.8 | 7.0 | — | — |
|  | Calcium chloride dihydrate | — | — | — | — | 1.1 | — |
|  | Magnesium sulfate (anhydrous) | — | — | — | — | — | 6.0 |
|  | Nickel(II) chloride hexahydrate | — | — | — | — | — | — |
|  | Zinc sulfate (anhydrous) | — | — | — | — | — | — |
| Surfactant | Polyoxyalkylene alkyl ether | 0.4 | 0.4 | 0.4 | 0.4 | 0.4 | 0.4 |
| Foam inhibitor | N-Octyl-2-pyrroridone | 1.2 | 1.2 | 1.2 | 1.2 | 1.2 | 1.2 |
| Antibacterial Agent | PROXEL LV | 0.1 | 0.1 | 0.1 | 0.1 | 0.1 | 0.1 |
| Corrosion Inhibitor | Benzotriazoles | 0.1 | 0.1 | 0.1 | 0.1 | 0.1 | 0.1 |
| Water | Deionized water | Balance | Balance | Balance | Balance | Balance | Balance |
| Total (Percent by mass) |  | 100.0 | 100.0 | 100.0 | 100.0 | 100.0 | 100.0 |
| Concentration (mol/kg) of multivalent metal salt |  | — | — | 0.13 | 0.49 | 0.07 | 0.37 |

TABLE 4

|  |  |  | Processing fluid | | | | | |
|---|---|---|---|---|---|---|---|---|
|  |  |  | 19 | 20 | 21 | 22 | 23 | 24 |
| Organic solvent | Glycerin |  | 7.0 | 7.0 | 7.0 | 7.0 | 7.0 | 7.0 |
|  | 1,3-Butane diol |  | 5.0 | 5.0 | 5.0 | 5.0 | 5.0 | 5.0 |
|  | 1,3-Propane diol |  | — | — | — | — | — | — |
|  | 1,2-Octane diol |  | 2.0 | 2.0 | 2.0 | 2.0 | 2.0 | 2.0 |
| Nonionic resin emulsion | Resin particle having structure unit a-1 | Urethane resin emulsion, Tg: −38 degrees C. | 2.0 | 2.0 | 2.0 | 2.0 | — | — |
|  |  | Nonionic urethane resin emulsion, Tg: 20 degrees C. | — | — | — | — | — | — |
|  |  | Nonionic urethane resin emulsion, Tg: −15 degrees C. | — | — | — | — | — | 2.0 |
| Anionic resin emulsion | Anionic urethane resin emulsion |  | — | — | — | — | 2.0 | — |
| Nonionic Resin | Cationic resin particle 1 (resin particle having structure unit represented by Chemical formula 1) (solid mass) |  | — | — | — | — | 35.0 | 35.0 |
|  | Cationic resin particle 2 (resin particle having structure unit represented by Chemical formula 2) (solid mass) |  | — | — | — | — | — | — |
|  | Polydiaryl dimethyl ammonium chloride (solid mass) |  | — | — | — | — | — | — |
| Multivalent metal salt | Calcium acetate monohydrate |  | — | — | 0.3 | 11.0 | — | — |
|  | Calcium chloride dihydrate |  | — | — | — | — | — | — |
|  | Magnesium sulfate (anhydrous) |  | — | — | — | — | — | — |
|  | Nickel(II) chloride hexahydrate |  | 7.1 | — | — | — | — | — |
|  | Zinc sulfate (anhydrous) |  | — | 3.2 | — | — | — | — |
| Surfactant | Polyoxyalkylene alkyl ether |  | 0.4 | 0.4 | 0.4 | 0.4 | 0.4 | 0.4 |
| Foam inhibitor | N-Octyl-2-pyrroridone |  | 1.2 | 1.2 | 1.2 | 1.2 | 1.2 | 1.2 |
| Antibacterial Agent | PROXEL LV |  | 0.1 | 0.1 | 0.1 | 0.1 | 0.1 | 0.1 |
| Corrosion Inhibitor | Benzotriazoles |  | 0.1 | 0.1 | 0.1 | 0.1 | 0.1 | 0.1 |
| Water | Deionized water |  | Balance | Balance | Balance | Balance | Balance | Balance |
| Total (Percent by mass) |  |  | 100.0 | 100.0 | 100.0 | 100.0 | 100.0 | 100.0 |
| Concentration (mol/kg) of multivalent metal salt |  |  | 0.35 | 0.20 | 0.22 | 0.76 | — | — |

In Tables 1 to 4, the product names and the manufacturing companies of the ingredients are as follows:

Urethane resin emulsion: resin particle having a structure unit a-1, glass transition temperature of −38 degrees C., SUPERFLEX® E2000, manufactured by DKS Co. Ltd.

Nonionic urethane resin emulsion: resin particle having a structure unit a-1, glass transition temperature of −15 degrees C., HYDRAN WLI-611, manufactured by DIC CORPORATION Anionic urethane resin emulsion: anionic resin emulsion, TAKELAC™ W5661, manufactured by Mitsui Chemicals Cationic resin particle 1: DK6810, resin including structure unit represented by Chemical formula 1, manufactured by SEIKO PMC CORPORATION

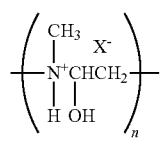

Chemical formula 1

In the Chemical formula 1, X⁻ represents Cl⁻ and n represents 0 or an integer of from 1 to 13.

Cationic resin particle 2: Catiomaster PD-T-2, resin particle including structure unit represented by Chemical formula 2, manufactured by Yokkaichi Chemical Company, Limited

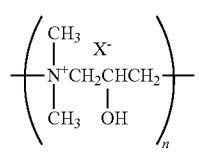

Chemical formula 2

In the Chemical formula 2, X⁻ represents Cl⁻ and n represents 0 or an integer of from 1 to 13.

Polydiaryl dimethyl ammonium chloride: UNISENCE CP-104, manufactured by SENKA corporation Calcium acetate monohydrate: manufactured by Showa Chemical Industry Co., LTD.

Calcium chloride dihydrate: manufactured by Showa Chemical Industry Co., LID.

Magnesium sulfate (anhydrous): manufactured by Showa Chemical Industry Co., LTD.

Nickel(II) chloride hexahydrate: manufactured by Showa Chemical Industry Co., LTD.

Nickel(II) chloride hexahydrate: manufactured by Showa Chemical Industry Co., LTD.

Polyoxyalkylene alkyl ether: EMULGEN LS103, manufactured by Kao Corporation

PROXEL LV, manufactured by AVECIA GROUP

Preparation Example 2 of Nonionic Resin Particle

Preparation of Ethylene Vinyl Acetate Resin Emulsion 1,061 g of PVA-217 (the degree of polymerization of 1,700, the degree of saponification of 88 mol percent, manufactured by KURARAY CO., LTD.), 19,440 g of deionized water, 12.7 g of L(+) sodium tartrate, 10.6 g of sodium acetate, and 0.4 g of ferrous chloride were loaded in a pressure tight autoclave equipped with a nitrogen introducing inlet, a thermometer, and a stirrer, and the mixture was completely dissolved at 95 degrees C. and cooled down to 60 degrees C. followed by nitrogen replacement. Thereafter, 22,360 g of vinyl acetate was loaded, ethylene was introduced under pressure until 45 kg/cm², and 1,000 g of 0.4 percent hydrogen peroxide aqueous solution was press-fitted in five hours followed by emulsion polymerization at 60 degrees C. pH of the polymerization at the initial stage was confirmed to be 5.2.

When the remaining amount of vinyl acetate reached 10 percent, ethylene was released until the pressure of ethylene was 20 kg/cm², and 50 g of 3 percent hydrogen peroxide aqueous solution was press-fitted to continue polymerization. When the remaining amount of vinyl acetate monomer reached 1.5 percent, ethylene was released followed by cooling down. Subsequent to cooling down, pH was confirmed to be 4.8. Thereafter, 20 g of sodium hydrogen sulfite was added followed by removing ethylene at 30 degrees C. at a reduced pressure of 100 mmHg for one hour. The system's pressure was restored to atmospheric pressure by nitrogen. Thereafter, 10 g of t-butylhydroperoxide was added followed by stirring for two hours to obtain an emulsion. pH at the completion of the polymerization was confirmed to be 4.7.

The thus-obtained emulsion was filtrated, and the solid mass was adjusted to be 50 percent by mass to obtain a nonionic resin particle (ethylene vinyl acetate resin emulsion) having the following structure unit a-2.

The glass transition temperature (Tg) of the thus-obtained ethylene vinyl acetate resin emulsion measured by differential scanning calorimetry (Thermo plus EV02/DSC, manufactured by Rigaku Corporation) was 0 degrees C.

Structure unit a-2

Preparation Example 1 of Pigment Dispersion

Preparation of Pigment Dispersion 1

Synthesis of Resin Containing Carboxyl Group 550 g of methylethyl ketone was loaded in the reaction container of automatic polymerization reactor (polymerization tester DSL-2AS type, available from TODOROKI SANGYO CO., LTD.) including a reaction container equipped with a stirrer, a dripping instrument, a temperature sensor, and a reflux instrument equipped with a nitrogen gas introducing device at its upper part, and the inside of the reaction container was replaced with nitrogen during stirring. Maintaining the inside of the reaction container in nitrogen atmosphere, the system was heated at 80 degrees C. Thereafter, a liquid mixture of 75.0 g of methacrylic acid-2-hydroxyethyl, 77.0 g of methacrylic acid, 80.0 g of styrene, 150.0 g of butylmethacrylate, 98.0 g of butylacrylate, 20.0 g of methylmethacrylate, and 40.0 g of t-butyl peroxy-2-ethylhexanate (PERBUTYL® O, manufactured by NOF CORPORATION) was dripped in four hours by the dripping instrument. After dripping, the reaction was caused to continue at the same temperature for 15 hours to obtain a methylethyl ketone solution of styrene-acrylic-based copolymer A having an anionic functional group (acid value of 100 mg KOH/g, mass average molecular weight of 21,000, and glass transition temperature (Tg, calculated) of 31 degrees C.). After the completion of the reaction, a part of methylethyl ketone was distilled away under a reduced pressure to obtain [Solution of copolymer A] having a non-volatile portion in an amount of 50 percent by mass.

Preparation of Pigment Dispersion 1

1,000 g of carbon black (Raven 1080, available from Colombian Carbon Japan Co.), 800 g of [Solution of copolymer A], 143 g of 10 percent sodium hydroxide aqueous solution, 100 g of methylethyl ketone, and 1,957 g of water were loaded in a mixing tank equipped with a jacket for cooling and stirred and mixed. The liquid mixture was dispersed by a dispersion device (SC mill SC100, manufactured by Mitsui Mining Company) filled with zirconia beads having a diameter of 0.3 mm for six hours in a circulation manner (liquid dispersion out of the dispersion device returned to the mixing tank). The number of rotation of the dispersion device was 2,700 rotation per minute (rpm), and cool water was caused to pass through the jacket for cooling to keep the temperatures of the liquid dispersion at 40 degrees C. or lower. After the completion of dispersion, raw liquid dispersion was extracted from the mixing tank, and the mixing tank and the flow paths in the dispersion device were rinsed with 10,000 g of water. The liquid after rinsing and the raw liquid dispersion were mixed to obtain a diluted liquid dispersion. The diluted liquid dispersion was placed in a glass distillator to distill away all of methylethyl ketone and a part of water. After the system was cooled down to room temperature, 10 percent hydrochloric acid was dripped to the distillator to control pH to 4.5 during stirring. Thereafter, the solid portion was filtrated and rinsed with water by Nutsche filtration equipment (pressure filtration equipment, manufactured by Japan Chemical Engineering & Machinery Co, Ltd.). The thus-obtained cake was taken to a vessel. 200 g of 20 percent potassium hydroxide aqueous solution was added thereto. Thereafter, the resultant was dispersed by a dispersion device (TK homodisper, manufactured by PRIMIX Corporation). Moreover, water was added thereto to adjust the non-volatile portion to obtain [aqueous pigment dispersion 1] dispersed in an aqueous medium as a complex particle in which carbon black having a non-volatile portion in an amount of 20 percent by mass was covered with a styrene-acrylic-based copolymer having a carboxyl group neutralized in potassium hydroxide.

Preparation Example 2 of Pigment Dispersion

Preparation of Pigment Dispersion Element 2

[Aqueous pigment dispersion 2 (cyan)] was obtained in the same manner as in Preparation Example 1 of Pigment Dispersion except that carbon black was replaced with copper phthalocyanine (SEIKALIGHT BLUE A612, manufactured by Dainichiseika Color & Chemicals Mfg. Co., Ltd.).

Preparation Example 1 of Ink

Preparation Example of Ink 1

22.0 percent by mass glycerin, 11.0 percent by mass 1,3-butane diol, 2.0 percent by mass 1,2-octane diol, 0.4 percent by mass fluorochemical surfactant (FS-300, manufactured by E. I. du Pont de Nemours and Company), 1.1 percent by mass 2,4,7,9-tetramethyldecane-4,7-diol, 0.1 percent by mass of PROXEL LV (manufactured by AVECIA GROUP), 0.5 percent by mass 2-amino-2methyl-1,3-propanediol, and deionized water were uniformly mixed by stirring for one hour. Thereafter, 2.0 percent by mass of nonionic resin urethane resin emulsion (resin particle having the structure unit a-1, glass transition temperature of −20 degrees C.) was added thereto followed by uniform mixing by stirring for one hour.

Thereafter, 8.0 percent by mass of [aqueous pigment dispersion 1] (solid mass) was added followed by uniform mixing by stirring for one hour. The thus-obtained mixture was pressure-filtrated with a polyvinilydene fluoride membrane filter having an average opening diameter of 0.8 μm to remove coarse particles and dust to obtain ink 1.

Preparation Examples 2 to 14 of Ink

Preparation of Inks 2 to 14

Inks 2 to 14 were obtained in the same manner as in Preparation Example 1 of Ink except that the composition was changed to those shown in Tables 5 and 6.

TABLE 5

| | | | Ink | | | |
|---|---|---|---|---|---|---|
| | | | 1 | 2 | 3 | 4 |
| Organic solvent | Glycerin | | 22.0 | 22.0 | 22.0 | 22.0 |
| | 1,3-Butane diol | | 11.0 | 11.0 | 11.0 | 11.0 |
| | 1,3-Propane diol | | — | — | — | — |
| | 1,2-Octane diol | | 2.0 | 2.0 | 2.0 | 2.0 |
| Coloring material | Aqueous pigment dispersion 1 (solid mass) | | 8.0 | — | 8.0 | 8.0 |
| | Aqueous pigment dispersion 2 (solid mass) | | — | 8.0 | — | — |
| Nonionic resin emulsion | Resin particle having structure unit a-1 | Urethane resin emulsion, Tg: −38 degrees C. | — | — | — | — |
| | | Nonionic urethane resin emulsion, Tg: 20 degrees C. | 2.0 | 2.0 | — | 0.5 |
| | | Nonionic urethane resin emulsion, Tg: −15 degrees C. | — | — | — | — |

TABLE 5-continued

| | | | | | | |
|---|---|---|---|---|---|---|
| | Resin particle having structure unit a-2 | Ethylene vinyl acetate resin emulsion (Tg of 0 degrees C., solid mass) | — | — | 2.0 | — |
| | | Vinyl acetate-acrylic resin emulsion (Tg of 30 degrees C., solid mass) | — | — | — | — |
| Resin emulsion | Polyester resin (Tg: 67 degrees C., solid mass) | | — | — | — | — |
| | Acrylic resin (Tg: 12 degrees C., solid mass) | | — | — | — | — |
| Surfactant | Fluorochemical surfactant | | 0.4 | 0.4 | 0.4 | 0.4 |
| Foam inhibitor | 2,4,7,9-tetramethyldecane-4,7-diol | | 1.1 | 1.2 | 1.2 | 1.2 |
| Antibacterial agent | PROXEL LV | | 0.1 | 0.1 | 0.1 | 0.1 |
| pH regulator | 2-Amino-2-ethyl-1,3-propane diol | | 0.5 | 0.5 | 0.5 | 0.5 |
| Water | Deionized water | | Balance | Balance | Balance | Balance |
| Total (Percent by mass) | | | 100.0 | 100.0 | 100.0 | 100.0 |

| | | | Ink | | |
|---|---|---|---|---|---|
| | | | 5 | 6 | 7 |
| Organic solvent | Glycerin | | 22.0 | 22.0 | 22.0 |
| | 1,3-Butane diol | | 11.0 | 11.0 | 11.0 |
| | 1,3-Propane diol | | — | — | — |
| | 1,2-Octane diol | | 2.0 | 2.0 | 2.0 |
| Coloring material | Aqueous pigment dispersion 1 (solid mass) | | 8.0 | 8.0 | 8.0 |
| | Aqueous pigment dispersion 2 (solid mass) | | — | — | — |
| Nonionic resin emulsion | Resin particle having structure unit a-1 | Urethane resin emulsion, Tg: −38 degrees C. | — | 2.0 | — |
| | | Nonionic urethane resin emulsion, Tg: 20 degrees C. | 15.0 | — | — |
| | | Nonionic urethane resin emulsion, Tg: −15 degrees C. | — | — | — |
| | Resin particle having structure unit a-2 | Ethylene vinyl acetate resin emulsion (Tg of 0 degrees C., solid mass) | — | — | — |
| | | Vinyl acetate-acrylic resin emulsion (Tg of 30 degrees C., solid mass) | — | — | 2.0 |
| Resin emulsion | Polyester resin (Tg: 67 degrees C., solid mass) | | — | — | — |
| | Acrylic resin (Tg: 12 degrees C., solid mass) | | — | — | — |
| Surfactant | Fluorochemical surfactant | | 0.4 | 0.4 | 0.4 |
| Foam inhibitor | 2,4,7,9-tetramethyldecane-4,7-diol | | 1.2 | 1.2 | 1.2 |
| Antibacterial agent | PROXEL LV | | 0.1 | 0.1 | 0.1 |
| pH regulator | 2-Amino-2-ethyl-1,3-propane diol | | 0.5 | 0.5 | 0.5 |
| Water | Deionized water | | Balance | Balance | Balance |
| Total (Percent by mass) | | | 100.0 | 100.0 | 100.0 |

TABLE 6

| | | Ink | | | |
|---|---|---|---|---|---|
| | | 8 | 9 | 10 | 11 |
| Organic solvent | Glycerin | 22.0 | 22.0 | 22.0 | 22.0 |
| | 1,3-Butane diol | 11.0 | 11.0 | — | 11.0 |
| | 1,3-Propane diol | — | — | 11.0 | — |
| | 1,2-Octanediol | 2.0 | 2.0 | 2.0 | 2.0 |
| Coloring material | Aqueous pigment dispersion 1 (solid mass) | 8.0 | 8.0 | 8.0 | 8.0 |
| | Aqueous pigment dispersion 2 (solid mass) | — | — | — | — |
| Nonionic resin emulsion | Resin particle having structure unit a-1 | Urethane resin emulsion, Tg: −38 degrees C. | — | — | — | — |
| | | Nonionic urethane resin emulsion, Tg: 20 degrees C. | — | — | 2.0 | 0.4 |
| | | Nonionic urethane resin emulsion, Tg: −15 degrees C. | — | — | — | — |
| | Resin particle having structure unit a-2 | Ethylene vinyl acetate resin emulsion (Tg of 0 degrees C., solid mass) | — | — | — | — |
| | | Vinyl acetate-acrylic resin emulsion (Tg of 30 degrees C., solid mass) | — | — | — | — |
| Resin emulsion | Polyester resin (Tg: 67 degrees C., solid mass) | 2.0 | — | — | — |
| | Acrylic resin (Tg: 12 degrees C., solid mass) | — | 2.0 | — | — |
| Surfactant | Fluorochemical surfactant | 0.4 | 0.4 | 0.4 | 0.4 |
| Foam inhibitor | 2,4,7,9-tetramethyldecane-4,7-diol | 1.2 | 1.2 | 1.2 | 1.2 |
| Antibacterial agent | PROXEL LV | 0.1 | 0.1 | 0.1 | 0.1 |
| pH regulator | 2-amino-2-ethyl-1,3-propane diol | 0.5 | 0.5 | 0.5 | 0.5 |
| Water | Deionized water | Balance | Balance | Balance | Balance |
| Total (Percent by mass) | | 100.0 | 100.0 | 100.0 | 100.0 |

| | | Ink | | |
|---|---|---|---|---|
| | | 12 | 13 | 14 |
| Organic solvent | Glycerin | 22.0 | 22.0 | 22.0 |
| | 1,3-Butane diol | 11.0 | 11.0 | 11.0 |
| | 1,3-Propane diol | — | — | — |
| | 1,2-Octane diol | 2.0 | 2.0 | 2.0 |
| Coloring material | Aqueous pigment dispersion 1 (solid mass) | 8.0 | 8.0 | 8.0 |
| | Aqueous pigment dispersion 2 (solid mass) | — | — | — |
| Nonionic resin emulsion | Resin particle having structure unit a-1 | Urethane resin emulsion, Tg: −38 degrees C. | — | — | — |
| | | Nonionic urethane resin emulsion, Tg: 20 degrees C.: | 20.0 | — | — |
| | | Nonionic urethane resin emulsion, Tg: −15 degrees C.: | — | — | 2.0 |

TABLE 6-continued

|  |  |  |  |  |
|---|---|---|---|---|
|  | Resin particle having structure unit a-2 | Ethylene vinyl acetate resin emulsion (Tg of 0 degrees C., solid mass) | — | — | — |
|  |  | Vinyl acetate-acrylic resin emulsion (Tg of 30 degrees C., solid mass) | — | — | — |
| Resin emulsion | Polyester resin (Tg: 67 degrees C., solid mass) |  | — | — | — |
|  | Acrylic resin (Tg: 12 degrees C., solid mass) |  | — | — | — |
| Surfactant | Fluorochemical surfactant |  | 0.4 | 0.4 | 0.4 |
| Foam inhibitor | 2,4,7,9-tetramethyldecane-4,7-diol |  | 1.2 | 1.2 | 1.1 |
| Antibacterial agent | PROXEL LV |  | 0.1 | 0.1 | 0.1 |
| pH regulator | 2-amino-2-ethyl-1,3-propane diol |  | 0.5 | 0.5 | 0.5 |
| Water | Deionized water |  | Balance | Balance | Balance |
| Total (Percent by mass) |  |  | 100.0 | 100.0 | 100.0 |

In Tables 5 and 6, the product names and the manufacturing companies of the ingredients are as follows: The product names and the manufacturers for other than the following components are the same as those shown in Tables 1 to 4.

Vinylacetate-acrylic resin emulsion: Tg of 30 degrees C., manufactured by Sumika Chemtex Company, Limited Polyester resin: ELITEL® KA-5034, Tg of 67 degrees C., manufactured by UNITIKA LID.

Acrylic resin: Tg of 12 degrees C., VONCOAT CF-614, manufactured by DIC CORPORATION Fluorochemical surfactant: FS-300, manufactured by E. I. du Pont de Nemours and Company Example 1

The processing fluid 1 and the ink 1 were combined as a set 1 of processing fluid and ink.

Using the set 1 of processing fluid and ink, storage stability, anti-beading, and abrasion resistance were evaluated in the following manner. The results are shown in Table 7.

Storage Stability

The processing fluid 1 was placed in glass bin (20 mL) and left still in a hemathermal tank at 60 degrees C. for two weeks. The initial viscosity and the viscosity after two week storage were measured at 25 degrees C. using a viscometer (SV-10, manufactured by A&D Company, Limited). The difference (viscosity increase level: viscosity change rate) between the initial viscosity and the viscosity after two week storage was calculated to evaluate storage stability based on the following evaluation criteria. A or B are suitably and practically usable.

Evaluation Criteria

A: Viscosity change rate from the initial viscosity is less than 1 percent

B: Viscosity change rate from the initial viscosity is from 1 percent to 5 percent C: Viscosity change rate from the initial viscosity surpasses 5 percent or agglomerated matter produced Forming of Solid Image Using a wire bar (winding diameter of 0.05 mm, manufactured by Kobayashi Engineering Works, Ltd.), the processing fluid 1 was evenly applied to a recording medium (New-DV, special white paper board, manufactured by HOKUETSU KISHU PAPER CO., LTD.) in an application amount of 2 g/m².

Thereafter, the ink 1 was discharged to the recording medium mentioned above by a liquid discharging device (IPSIO GXe5500, manufactured by Ricoh Company Limited) to obtain a print sample.

The print chart used was a square image of 3 cm×3 cm formed with dot patterns.

Anti-Beading

The solid portion of the solid image of 3 cm square formed with the dot pattern was visually observed to evaluate anti-beading based on the following evaluation criteria. As the value increases, anti-beading becomes better. 3 to 5 are suitably and practically usable.

Evaluation Criteria

5: No beading observed

4: Excessively minute amount of beading observed without causing no practical problem (not recognizable without steady gaze)

3: Slight beading observed, causing no problem

2: Beading observed and clearly recognized (causing problem)

1: Violent beading observed (the degree as if no processing fluid was applied)

Abrasion Resistance (Scratch by Fingernail)

The solid portion of the solid image of 3 cm square formed with the dot pattern was scratched by fingernail and thereafter, image quality was visually observed to evaluate abrasion resistance based on the following evaluation criteria.

S or A are Suitably and Practically Usable

Evaluation Criteria

S: No scratch observed by fingernail, with little change in image density

A: No scratch observed by fingernail, with a change in image density

B: Minor scratch observed

C: Clear scratch observed

Examples 2 to 31 and Comparative Examples 1 to 9

The sets of the processing fluids and the inks were shown in Table 7 for Examples 2 to 31 and Comparative Examples 1 to 9. Using the set of the processing fluid and the ink, storage stability, anti-beading, and abrasion resistance were evaluated in the same manner as in Example 1. The results are shown in Table 7.

TABLE 7

|  |  | Processing fluid | Ink | Evaluation result | | |
|---|---|---|---|---|---|---|
|  |  |  |  | Storage Stability | Anti-beading | Abrasion resistance (scratch by fingernail) |
| Example | 1 | 1 | 1 | A | 5 | S |
|  | 2 | 2 | 1 | A | 5 | S |
|  | 3 | 3 | 1 | A | 4 | S |
|  | 4 | 4 | 1 | A | 5 | S |
|  | 5 | 5 | 1 | A | 5 | S |
|  | 6 | 6 | 1 | A | 3 | S |
|  | 7 | 7 | 1 | A | 5 | S |
|  | 8 | 8 | 1 | A | 5 | A |
|  | 9 | 10 | 1 | A | 5 | A |
|  | 10 | 11 | 1 | B | 5 | S |
|  | 11 | 12 | 1 | A | 3 | S |
|  | 12 | 13 | 1 | B | 5 | S |
|  | 13 | 1 | 2 | A | 5 | S |
|  | 14 | 1 | 4 | A | 5 | S |
|  | 15 | 1 | 5 | A | 5 | S |
|  | 16 | 1 | 6 | A | 5 | A |
|  | 17 | 1 | 10 | A | 5 | A |
|  | 18 | 1 | 11 | A | 5 | A |
|  | 19 | 1 | 12 | B | 5 | A |
|  | 20 | 8 | 10 | A | 5 | A |
|  | 21 | 15 | 1 | A | 5 | S |
|  | 22 | 16 | 1 | A | 5 | S |
|  | 23 | 17 | 1 | A | 5 | S |
|  | 24 | 18 | 1 | A | 5 | S |
|  | 25 | 19 | 1 | A | 5 | S |
|  | 26 | 20 | 1 | A | 4 | S |
|  | 27 | 21 | 1 | A | 3 | S |
|  | 28 | 22 | 1 | B | 5 | S |
|  | 29 | 24 | 1 | A | 5 | A |
|  | 30 | 1 | 14 | A | 5 | A |
|  | 31 | 24 | 14 | A | 5 | A |
| Comparative Example | 1 | 9 | 1 | A | 5 | B |
|  | 2 | 14 | 1 | A | 5 | C |
|  | 3 | 1 | 3 | A | 5 | C |
|  | 4 | 1 | 7 | A | 5 | C |
|  | 5 | 1 | 8 | A | 1 | B |
|  | 6 | 1 | 9 | A | 2 | C |
|  | 7 | 1 | 13 | A | 5 | C |
|  | 8 | 23 | — | C (agglomerated matter produced) | Unable to evaluate | Unable to evaluate |
|  | 9 | — | 1 | — | 1 | C |

Aspects of the present disclosure are, for example, as follows.

1. A printing method includes applying a processing fluid to a recording medium and applying an ink to the recording medium, wherein the processing fluid contains a first nonionic resin including the following structure unit a-1, the first nonionic resin having a glass transition temperature of 15 degrees C. or lower, wherein the ink contains a second nonionic resin including the following structure unit a-1 and a coloring material.

Structure unit a-1

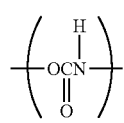

2. The printing method according to 1 mentioned above, wherein the second nonionic resin has a glass transition temperature of 20 degrees C. or lower.

3. The printing method according to 1 or 2 mentioned above, wherein the processing fluid contains at least one of a cationic resin and a multivalent metal salt.

4. The printing method according to 3 mentioned above, wherein the multivalent metal salt is at least one member selected from the group consisting of a calcium salt, magnesium salt, and a nickel salt.

5. The printing method according to any one of 1 to 4 mentioned above, wherein the first nonionic resin accounts for 0.5 to 15 percent by mass of the total amount of the processing fluid.

6. The printing method according to any one of 3 to 5, wherein the multivalent metal salt has a concentration of from 0.05 to 0.5 mol/kg.

7. The printing method according to any one of 3 to 6 mentioned above, wherein the cationic resin accounts for 1 to 50 percent by mass of the total amount of the processing fluid.

8. The printing method according to any one of 3 to 7 mentioned above, wherein the cationic resin in the processing fluid contains a structure unit represented by the following Chemical formula 1 or the following Chemical formula 2.

Chemical formula 1

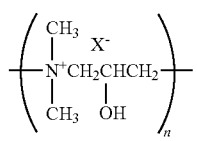

In the Chemical formula 1, X⁻ represents an anionic counter ion and n represents 0 or an integer of from 1 to 13.

Chemical formula 2

In the Chemical formula 1, X⁻ represents an anionic counter ion and n represents 0 or an integer of from 1 to 13. Tsuketashi 9. The printing method according to any one of 1 to 8 mentioned above, wherein the second nonionic resin accounts for 0.5 to 20 percent by mass of the total amount of the ink.

10. The printing method according to any one of 1 to 9 mentioned above, wherein the ink and the processing fluid contain 1,3-butanediol.

11. The printing method according to any one of 1 to 10 mentioned above, wherein the glass transition temperature of the first nonionic resin is 0 degrees C. or lower.

12. The printing method according to any one of 3 to 11 mentioned above, wherein the multivalent metal salt is at least one member selected from the group consisting of a titanium compound, a chromium compound, a copper compound, a cobalt compound, a strontium compound, a barium compound, an iron compound, an aluminum compound, a calcium compound, a magnesium compound, a zinc compound, and a nickel compound.

13. The printing method according to 12 mentioned above, wherein the multivalent metal salt is at least one member selected from the group consisting of a calcium compound salt, magnesium compound salt, and a nickel compound salt.

14. The printing method according to 13 mentioned above, wherein the multivalent metal salt is the calcium compound salt.

15. The printing method according to 1 to 14 mentioned above, wherein the ink is applied to the area to which the processing fluid has been applied.

16. A set contains a processing fluid containing a first nonionic resin including the following structure unit a-1, the first nonionic resin having a glass transition temperature of 15 degrees C. or lower, and an ink containing a second nonionic resin including the following structure unit a-1 and a coloring material.

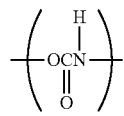

Structure unit a-1

17. The set according to 16 mentioned above, wherein the second nonionic resin has a glass transition temperature of 20 degrees C. or lower.

18. The set according to 16 or 17 mentioned above, wherein the first nonionic resin accounts for 0.5 to 15 percent by mass of the total amount of the processing fluid.

19. A printing device includes a recording medium, an ink, a processing fluid applying device to apply a processing fluid to the recording medium, and an ink applying device to apply the ink to the recording medium, wherein the processing fluid contains a first nonionic resin represented by the following structure unit a-1, the first nonionic resin having a glass transition temperature of 15 degrees C. or lower, wherein the ink contains a second nonionic resin represented by the following structure unit a-1 and a coloring material.

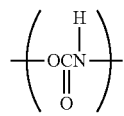

Structure unit a-1

20. A set contains a processing fluid containing a first nonionic resin including the following structure unit a-1 and an ink containing a second nonionic resin including the following structure unit a-1 and a coloring material, wherein the first nonionic resin has a glass transition temperature not higher than the second nonionic resin.

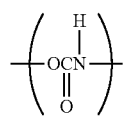

Structure unit a-1

According to the present disclosure, a printing method of forming images with excellent abrasion resistance is provided.

Having now fully described embodiments of the present invention, it will be apparent to one of ordinary skill in the art that many changes and modifications can be made thereto without departing from the spirit and scope of embodiments of the invention as set forth herein.

What is claimed is:

1. A set comprising:
a processing fluid comprising a first nonionic resin and a cationic resin, the first nonionic resin having a glass transition temperature of 15 degrees C. or lower; and
an ink comprising a second nonionic resin and a coloring material,
wherein both of the first nonionic resin and the second nonionic resin have a structure unit a-1:

Structure unit a-1 the cationic resin has a structure unit of chemical formula 1 or 2:

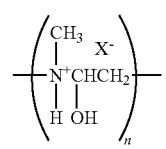

Chemical formula 1

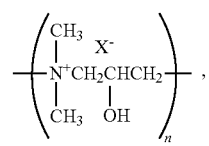

Chemical formula 2 wherein, $X^-$ represents an anionic counter ion and n represents 0 or an integer of from 1 to 13.

2. A printing method with the set according to claim 1, the method comprising:
applying the processing fluid to the recording medium; and
applying the ink to the recording medium.

3. The printing method according to claim 2, wherein the second nonionic resin has a glass transition temperature of 20 degrees C. or lower.

4. The printing method according to claim 2, wherein the processing fluid further comprises a multivalent metal salt.

5. The print method according to claim 4, wherein the multivalent metal salt is at least one member selected from the group consisting of a calcium salt, magnesium salt, and a nickel salt.

6. The printing method according to claim 2, wherein the ink is applied to an area to which the processing fluid has been applied.

7. The set according to claim 1, wherein the first nonionic resin has a glass transition temperature not higher than a glass transition temperature of the second nonionic resin.

8. The set according to claim 1, wherein the second nonionic resin has a glass transition temperature of 20 degrees C. or lower.

9. The set according to claim 1, wherein the processing fluid further comprises a multivalent metal salt.

10. The set according to claim 9, wherein the multivalent metal salt is at least one member selected from the group consisting of a calcium salt, magnesium salt, and a nickel salt.

11. The set according to claim 9, wherein the multivalent metal salt has a concentration of from 0.05 to 0.5 mol/kg.

12. The set according to claim 1, wherein the first nonionic resin accounts for 0.5 to 15 percent by mass of a total amount of the processing fluid.

13. The set according to claim 1, wherein the cationic resin accounts for 1 to 50 percent by mass of a total amount of the processing fluid.

14. The set according to claim 1, wherein the second nonionic resin accounts for 0.5 to 20 percent by mass of a total amount of the ink.

15. The set according to claim 1, wherein the ink and the processing fluid further comprise 1,3-butane diol.

16. The set according to claim 15, wherein the ink and the processing fluid further comprise 1,2-octane diol.

17. The set according to claim 1, wherein the processing fluid further comprises a third nonionic resin having a structure unit a-2:

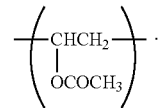

Structure unit a-2

18. The set according to claim 1, wherein the processing fluid further comprises polyoxyalkylene alkyl ether.

19. The set according to claim 1, wherein the cationic resin has the structure unit of chemical formula 1.

20. The set according to claim 1, wherein the ink comprises a fluorochemical surfactant.

* * * * *